US008812525B1

(12) United States Patent
Taylor, III

(10) Patent No.: US 8,812,525 B1
(45) Date of Patent: Aug. 19, 2014

(54) LOCAL SQL FILES FOR MOBILE CLIENTS

(75) Inventor: Buford Leonard Taylor, III, San Francisco, CA (US)

(73) Assignee: Eventbrite, Inc., San Francisco, CA (US)

( * ) Notice: Subject to any disclaimer, the term of this patent is extended or adjusted under 35 U.S.C. 154(b) by 420 days.

(21) Appl. No.: 12/981,940

(22) Filed: Dec. 30, 2010

(51) Int. Cl.
*G06F 17/30* (2006.01)

(52) U.S. Cl.
USPC ........... 707/758; 707/706; 707/713; 707/722; 707/736; 707/781; 705/5; 726/28

(58) Field of Classification Search
USPC ................. 707/706, 713, 722, 758, 736, 781; 705/5; 726/28
See application file for complete search history.

(56) References Cited

U.S. PATENT DOCUMENTS

| | | | | |
|---|---|---|---|---|
| 2004/0137882 | A1* | 7/2004 | Forsyth | 455/414.1 |
| 2007/0233708 | A1* | 10/2007 | Baio et al. | 707/100 |
| 2010/0091687 | A1* | 4/2010 | Beers et al. | 370/260 |
| 2012/0042392 | A1* | 2/2012 | Wu | 726/28 |
| 2012/0078667 | A1* | 3/2012 | Denker et al. | 705/5 |

OTHER PUBLICATIONS

U.S. Appl. No. 12/981,913, filed Dec. 30, 2010, Julie Ann Thompson.
U.S. Appl. No. 12/982,222, filed Dec. 30, 2010, Julie Ann Thompson.
By Theo, "Eventbrite Adds Major New Check-In Feature|Eventbrite Blog", http://blog.eventbrite.com/eventbrite-adds-major-new-check-in-feature, Nov. 8, 2010.
By Theo, "Eventbrite iPhone app 2.0 arrives: Barcode scanners and more!|Eventbrite Blog", http://blog.eventbrite.com/barcode-scanning, Oct. 27, 2010.
By Brianna, "How Eventbrite's Tracking Links and Charts Made our SF Event a Success|Eventbrite Blog", http://blog.eventbrite.com/how-eventbrites-tracking-links-and-charts-made-our-sf-event-a-..... Oct. 26, 2010.
"SQLite Tutorial—Selecting Data", Blancer.com Tutorials and Projects, http://blancer.com/tutorials/i-phone/76991/sqlite-tutorial-selecting-data/, downloaded Dec. 9, 2010.
By JK, "SQLite Tutorial—Updating Data", iPhone SDK Articles, http://www.iphonesdkarticles.com/2008/11/sqlite-tutorial-updating-data.html, Nov. 2, 2008.
From Wikipedia, "JSON", http://en.wikipedia.org/wiki/JSON, downloaded Dec. 9, 2010.
From Wikipedia, "MySQL", http://en.wikipedia.org/w/index.php?title=MYSQL&printable=yes, downloaded Dec. 9, 2010.
Julie Thompson et al., "Mobile Check-In Tools", U.S. Appl. No. 12/981,913, filed Dec. 30, 2010.
Julie Thompson et al., "Real-Time Attendance Reporting", U.S. Appl. No. 12/982,222, filed Dec. 30, 2010.
TicketBiscuit.com, "A Complete Box Office Solution", http://web.archive.org/web/20090223104500/http://www.ticketbiscuit.com/ticketing-system/box-office-software.aspx, retrieved Feb. 23, 2009.

* cited by examiner

*Primary Examiner* — Syling Yen
(74) *Attorney, Agent, or Firm* — Baker Botts L.L.P.

(57) ABSTRACT

In one embodiment, a method includes receiving a request from a mobile client system for an event attendee list and transmitting a request to a data store for the event attendee list. If the event attendee list is available on the data store, then receiving the event attendee list from the data store, else transmitting a request to a data store for the event attendee list and receiving the event attendee list from a module. After receiving the event attendee list, the method includes transmitting the event attendee list to the mobile client system.

15 Claims, 21 Drawing Sheets

US 8,812,525 B1

LOCAL SQL FILES FOR MOBILE CLIENTS

TECHNICAL FIELD

The present disclosure generally relates to online event management systems and systems for managing and monitoring ticket processing and attendee check-in at events.

BACKGROUND

Many websites allow users to conduct a variety of actions online, such as view content, write reviews, order items, purchase tickets, etc. These websites often present the user with a plurality of actions to choose from and allow the user to select the type of action he would like to perform. Once the action is selected, the website typically redirects the client system of the user to a webpage where the action can be completed. For example, some websites allow users to organize events using an online event management system. An online event management system may allow an event organizer to organize and manage various aspects of an event, such as, for example, managing attendee registrations and selling tickets, promoting the event, and managing attendee check-in at the event. An online event management system may also allow users to view event listings, register for events, and purchase tickets for events. Online systems, such as online event management systems, can typically be accessed using suitable browser clients (e.g., Firefox, Chrome, Internet Explorer).

Entry management at events is a long established problem. Typical event organizers will have someone man the door equipped with a clipboard, a list of all the registered attendees printed on paper and a pen to mark off those who have entered. The process is time consuming and breaks down when an event has multiple locations with multiple points of entry. Entry lines will often be long and slow as the person at the door looks up each person on the list. When multiple locations are involved, a person could sneak into the event by giving the name of a person that went in the other door.

Event management information can be stored in relational databases. Generally, a relational database is a collection of relations (frequently referred to as tables). Relational databases use a set of mathematical terms, which may use Structured Query Language (SQL) database terminology. MySQL is a relational database management system (RDBMS) that runs as a server providing multi-user access to a number of databases. SQLite is a software library that implements a self-contained, serverless, zero-configuration, transactional SQL database engine.

DESCRIPTION OF EXAMPLE EMBODIMENTS

System Overview

Figure 1:
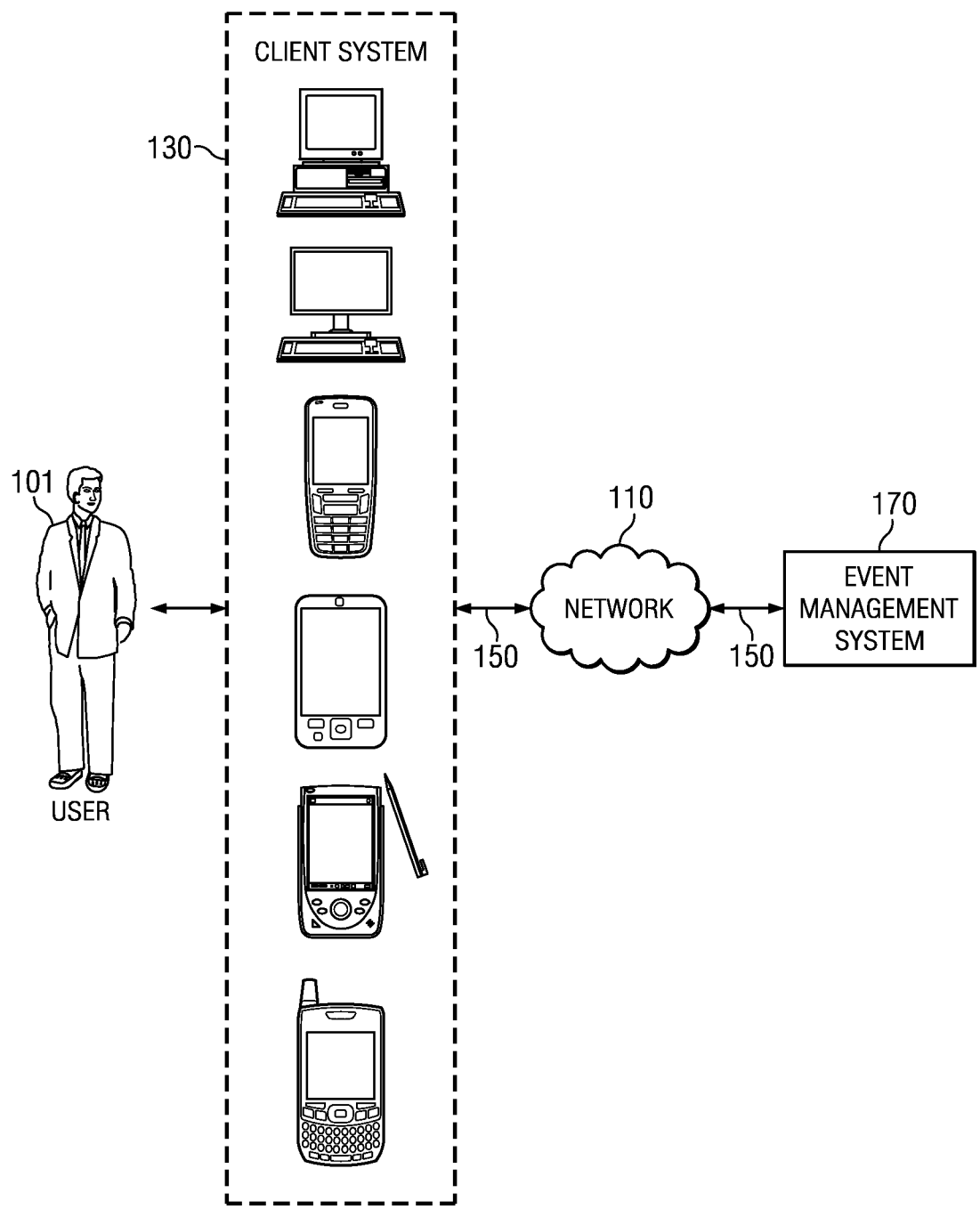
FIG. 1 illustrates an example system for implementing an online event management system with mobile check-in systems.

FIG. 1 illustrates an example system 100 for implementing an online event management system with mobile check-in systems. System 100 includes a user 101, a client system 130, and an event management system 170 connected to each other by a network 110. Although FIG. 1 illustrates a particular arrangement of user 101, client system 130, event management system 170, and network 110, this disclosure contemplates any suitable arrangement of user 101, client system 130, event management system 170, and network 110. As an example and not by way of limitation, two or more of client system 130 and event management system 170 may be connected to each other directly, bypassing network 110. As another example and not by way of limitation, two or more of client system 130 and event management system 170 may be physically or logically co-located with each other in whole or in part. Moreover, although FIG. 1 illustrates a particular number of users 101, client system 130, event management systems 170, and networks 110, this disclosure contemplates any suitable number of users 101, client systems 130, event management systems 170, and networks 110. As an example and not by way of limitation, system 100 may include multiple users 101, client systems 130, event management systems 170, and networks 110.

In particular embodiments, an event management system 170 may be a network-addressable computing system that can host one or more event organization and management systems. An event management system 170 may generate, store, receive, and transmit event-related data, such as, for example, event listings, event details, event history details, event registration details, event organizer details, event attendee details, ticket purchase details, attendee check-in details, and event displays. An event management system 170 may be accessed by the other components of system 100, either directly or via network 110. In particular embodiments, one or more users 101 may use one or more client systems 130 to access, send data to, and receive data from an event management system 170. A client system 130 may access an event management system 170 directly, via network 110, or via a third-party system. A client system 130 may be any suitable computing device, such as, for example, a personal computer, a laptop, a cellular phone, a smartphone, a personal digital assistant, an ultra-mobile PC, or a computing tablet.

Network 110 may be any suitable communications network. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Connections 150 may connect client system 130 and event management system 170 to communication network 110 or to each other. This disclosure contemplates any suitable connections 150. In particular embodiments, one or more connections 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 150 each include an ad hoc network, an intranet, an extranet, a VPN, a LAN, a WLAN, a WAN, a WWAN, a MAN, a portion of the Internet, a portion of the PSTN, a cellular telephone network, another connection 150, or a combination of two or more such connections 150. Connections 150 need not necessarily be the same throughout system 100. One or more first connections 150 may differ in one or more respects from one or more second connections 150.

Event Management Systems

In particular embodiments, an event management system 170 may allow users 101 to organize and manage events. An event may be, for example, a party, a concert, a conference, a sporting event, a fundraiser, a networking event, or a live performance. Events may occur online (such as, for example, a web-based seminar) and offline (such as, for example, a live seminar in a lecture hall). An online event management system may allow an event organizer to organize and manage various aspects of an event, such as, for example, managing attendee registrations and selling tickets, managing funds from ticket sales, promoting the event, and managing attendee check-in at the event. An online event management system may also allow event attendees to view and manage various aspects of registering for an event, such as, for example, viewing event listings, viewing event information, viewing event history information, registering for events, and purchasing tickets for events. As an example and not by way of limitation, a first user may use event management system 170 to organize an event. The first user may input event information associated with the event to create an event listing on event management system 170. One or more second users may then use event management system 170 to view the event listing and register for the event, such as, for example, by purchasing tickets for the event. Although this disclosure describes particular types of events, this disclosure contemplates any suitable types of events. Moreover, although this disclosure describes organizing and managing particular aspects of an event, this disclosure contemplates organizing and managing any suitable aspects of an event.

In particular embodiments, an event management system 170 may have an event listing associated with each event managed by the system. An event listing may be hosted on event management system 170, such as, for example, on a particular webpage associated with the event listing. An event listing may be accessed and displayed by any suitable client system 130, such as, for example, by accessing the particular webpage associated with the event listing. An event listing may have an event information associated with the event listing. Event information may include information describing the event date, type, cost, organizer, promoter, geographic location, venue, performer, tickets, ticket identifiers, attendees, attendee check-in status, and other suitable event information. Although this disclosure describes particular types of event information, this disclosure contemplates any suitable types of event information. An event listing may also have a payment information associated with the event listing. Payment information may include the address verification system score for the payments for the event, the credit cards used to pay for the event, the locations of payers, the IP addresses of the payers, the number and amount of prior payouts to the event organizer, and other suitable payment information. Although this disclosure describes particular types of payment information, this disclosure contemplates any suitable types of payment information.

In particular embodiments, the event information associated with an event listing may include an event attendee list. The event attendee list may include information describing one or more of the attendees registered to attend the event, include the attendee's name, phone number, mailing address, email address, payment information, ticket order information, ticket information, check-in status, and other suitable attendee information. Each attendee may be assigned one or more tickets, and each ticket may have a unique ticket identifier. A ticket identifier may be an identification number, a barcode, a 2D barcode, a QR code, or another suitable unique identifier. The event attendee list may also include information describing the check-in status of an attendee. Check-in status may indicate whether an attendee is or is not checked-in at the event. As an example and not by way of limitation, the check-in status of an attendee may indicate the attendee is checked-in after the attendee arrives at the event and provides a ticket to an event organizer. Although this disclosure describes particular types of information associated with an event attendee list, this disclosure contemplates any suitable types of information associated with an event attendee list.

In particular embodiments, each user 101 of event management system 170 may have an event history information associated with the user 101. Event history information may include event information and payment information associated with one or more events a user 101 has attended or has registered to attend, as well as purchase history information associated with the event. Event history information may also include event information and payment information associated with one or more event listings a user 101 has created, organized, and managed. Although this disclosure describes particular event history information, this disclosure contemplates any suitable event history information.

In particular embodiments, the event management system 170 may use unique client identifiers to identify a user 101. As an example and not by way of limitation, the event management system 170 may assign a unique client identifier to each client system 130. The event management system 170 may assign each client system 130 with an unique client identifier based on the IP address of the client system 130, tracking cookies on the client system 130 (which may be appended to HTTP requests transmitted by the client system 130), the serial number or asset tag of the client system 130, or other suitable identifying information. As another example and not by way of limitation, the event management system 170 may assign a unique client identifier to each user 101, which the user must provide to the event management system 170 via a client system 130. The event management system 170 may assign each user 101 with a username and password that the user 101 can input into client system 130, which then transmits the username and password to the event management system 170. In particular embodiments, the event management system 170 can use the unique client identifier to determine that the user 101 is accessing the system.

In particular embodiments, the event management system 170 may maintain an event management account for a user 101. The event management account may contain a variety of information about the user 101. As an example and not by way of limitation, an event management account may contain personal information (such as, for example, name, sex, location, and interests), social network information (such as, for example, friend connections), financial information (such as, for example, income and credit history), event history information (such as, for example, the type, data, cost, venue, performers, and geographic location of the events a user 101 has organize, registered for, or attended), and other suitable information related to the user 101. The event management account may also contain information related to the funds collected by event management system 170 from ticket sales for event listings created by the user 101, and information related to funds paid out to the user 101. Although this disclosure describes event management accounts containing particular types of information about a user 101, this disclosure contemplates event management accounts containing any suitable information about a user 101.

In particular embodiments, an event management system 170 may use a "shopping cart" model to facilitate event registration. As an example and not by way of limitation, event management system 170 may present a user 101 with a plurality of event listings. The user 101 may select one or more of the events to register for. When the user 101 selects an event listing on event management system 170, the event management system 170 metaphorically adds that item to a shopping cart. When the user 101 is done selecting event listings, then all the items in the shopping cart may be "checked out" (i.e., ordered) when the user 101 provides billing information (and possibly shipment information). Billing information may include the user 101's name, address, credit card information, bank account number, PayPal username, and other suitable billing or payment information. In some embodiments, when a user 101 selects an event listing, then that event listing is "checked out" by automatically prompting the user for the billing and shipment information. The user 101 then may be presented with a registration webpage that prompts the user for the user-specific registration information to complete the registration. That webpage may be prefilled with information that was provided by the user 101 when registering for another event or when establishing a user account on event management system 170. The information may then be validated by event management system 170, and the registration may be completed. At this point, the user 101 may be presented with a registration confirmation webpage that displays the details of the event and registration details. Event management system 170 may also charge or withdraw funds from a financial account associated with user 101 based on the billing information provided by the user 101. Although this disclosure describes particular means for registering for events and purchasing tickets, this disclosure contemplates any suitable means for registering for events and purchasing tickets.

In particular embodiments, a user 101 may register for an event by purchasing a ticket for the event. A user 101 may purchase tickets for an event for himself or others. Each ticket purchase order may be associated with a particular order identifier, which may be any suitable identifying information. A user 101 may purchase one or more tickets to an event for one or more attendees. Each ticket may be associated with a particular attendee. Each attendee may be associated with a particular attendee identifier, which may be any suitable identifying information. Therefore, each order identifier may be associated with one or more attendee identifiers. Each attendee may be associated with one or more tickets. Therefore, each attendee identifier may be associated with one or more ticket identifiers. In particular embodiments, the ticket identifier is a particular barcode number.

In particular embodiments, an event management system 170 may facilitate paying out funds to an event organizer. The event management system 170 may collect funds from ticket buyers, hold these funds, and transfer some or all of the funds to the event organizer. In particular embodiments, one or more users 101 may buy one or more tickets on event management system 170, and the system may collect some or all of the funds associated with these ticket sales. As an example and not by way of limitation, nine users 101 may purchase tickets to a concert using event management system 170. If the tickets cost $100 each, then event management system 170 would have collected $900 from the users 101. In particular embodiments, event management system 170 may then pay out funds from ticket sales to an event organizer. As an example and not by way of limitation, event management system 170 may transfer or deposit the funds into a financial account associated with the event organizer. Event management system 170 may pay out some or all of the funds. For example, if each $100 ticket includes an $8 service charge, event management system 170 may only pay out $92 per ticket to the event organizer. In particular embodiments, event management system 170 may pay out funds to the event organizer at particular times. As an example and not by way of limitation, event management system 170 may pay out funds to an event organizer after each ticket sale. As another example and not by way of limitation, event management system 170 may pay out funds in response to a request from the event organizer. The event organizer may request to withdraw all funds from his account. Alternatively, the event organize may request to withdraw less than all the funds. For example, if event management system 170 has collected $900 from selling tickets, the event organizer may request that the system pay out only $700. In particular embodiments, event management system 170 may hold funds for a particular time period. Event management system 170 may hold these funds for a time sufficient to allow payments to clear or be verified by a bank or credit card processor. If the funds used to purchase a ticket have not yet cleared, event management system 170 may hold the funds and not allow these funds to be paid out. Although this disclosure describes a particular process for paying out funds to an event organizer, this disclosure contemplates any suitable process for paying out funds to an event organizer.

In particular embodiments, an event management system 170 may facilitate checking-in one or more attendees to an event. Event management system 170 may use the event attendee list to track the arrival of attendees at an event. An event organizer may use a client system 130 to access event management system 170. The event organizer may then access the event attendee list. The event attendee list may be accessed and stored locally, remotely, or both. As an example and not by way of limitation, the event organizer may download the event attendee list locally to the client system 130. As another example and not by way of limitation, the event organizer may access the event attendee list remotely on a webpage hosted by event management system 170. As yet another example and not by way of limitation, the event organizer may download the event attendee list from event management system 170 and store the event attendee list locally on client system 130. The event organizer may then update the event attendee list locally on client system 130 and then upload an updated event attendee list to event management system 170. The event attendee list may include information describing one or more of the attendees registered to attend the event, include the attendee's name, phone number, mailing address, email address, payment information, ticket information, check-in status, and other suitable attendee information. In particular embodiments, the event organizer may update the event attendee list to indicate the check-in status of attendees as appropriate. As an example and not by way of limitation, the event organizer may check-in an attendee when the attendee arrives at an event. When the attendee arrives at the event, he may provide his ticket to the event organizer, who can then access the event attendee list and update the check-in status of the attendee to identify that the attendee is checked-in. First, an event organizer may use the event attendee list to confirm whether an attendee is listed on the event attendee list (i.e., registered to attend the event), and whether the attendee is already checked-in to the event (for example, to prevent a person from sneaking in under the premise of being an attendee who has already checked-in). The event organizer may search the event attendee list for a particular attendee. An attendee can provide some form of identification, such as, for example, the attendee's name or email address. As an example and not by way of limitation, if the attendee provides his name or email, the event organizer can review the event attendee list to see if the attendee is on the list. Alternatively, the attendee can provide a ticket, which may have a ticket identifier. As another example and not by way of limitation, if the attendee provides a ticket, the event organizer can review the attendee list to see if the ticket identifier is on the list. Next, the event organizer may use the event attendee list to identify whether or not the attendee is already checked-in to the event. As an example and not by way of limitation, the event attendee list may identify that an attendee is not checked-in at an event by default. The event organizer may then update the check-in status of the attendee to identify that the attendee is checked-in. Once an attendee is checked-in, the event organizer may allow the attendee to enter the event. Although this disclosure describes a particular process for checking-in attendees to an event, this disclosure contemplates using any suitable process for checking-in attendees to an event. Furthermore, although this describes using particular systems for checking-in attendees to an event, this disclosure contemplates using any suitable systems for checking-in attendees to an event.

Mobile Check-in Tools

FIGS. 2A thru 2G illustrate an example mobile check-in system 200. In particular embodiments, a plurality of mobile check-in systems 200 may be used to facilitate checking-in a plurality of attendees to an event. Although this disclosure describes particular components performing particular processes to facilitate checking-in a plurality of attendees to an event, this disclosure contemplates using any suitable components and any suitable processes to facilitate checking-in a plurality of attendees to an event.

In particular embodiments, the mobile check-in system 200 may include a mobile client system 230, a display 290, a user interface 240, and a camera 250. The mobile check-in system 200 may also host one or more applications, such as, for example, an application for facilitating checking-in one or more attendees to an event. Although FIGS. 2A thru 2G illustrate a particular arrangement of a mobile client system 230, display 290, user interface 240, and camera 250, this disclosure contemplates any suitable arrangement of mobile client system 230, display 290, user interface 240, and camera 250. As an example and not by way of limitation, both display 290 and camera 250 may be located on the front of the mobile client system 230. As another example and not by way of limitation, display 290, camera 250, or both may be independent systems connected to mobile client system 230 by a suitable connection. Moreover, although FIGS. 2A thru 2G illustrate a particular number of mobile client systems 230, displays 290, user interfaces 240, and cameras 250, this disclosure contemplates any suitable number of mobile client systems 230, displays 290, user interfaces 240, and cameras 250. As an example and not by way of limitation, mobile check-in system 200 may include multiple mobile client systems 230, displays 290, user interfaces 240, and cameras 250.

In particular embodiments, a mobile check-in system 200 may include one or more mobile client systems 230. The mobile client system 230 may be a network-addressable mobile computing system that can host one or more applications. In particular embodiments, one or more client systems 130 may be a mobile client system 230. A mobile client system 230 may generate, store, receive, and transmit event information, event listings, event attendee lists, event check-in data, and other suitable event information. Event check-in data may include, for example, event details, event organizer details, ticket details, attendee details, and other suitable event check-in data. A mobile client system 230 may be accessed by other systems, such as one or more components of system 100, either directly or via a suitable network, such as network 110. In particular embodiments, one or more event organizers, such as users 101, may use one or more mobile client systems 230 to access, send data to, and receive data from an event management system 170. A mobile client system 230 may access an event management system 170 directly, via network 110, or via a third-party system. Although this disclosure describes and FIGS. 2A thru 2G illustrate a mobile client system 230 as a particular type of client system, this disclosure contemplates a mobile client system 230 as any suitable type of client system. As an example and not by way of limitation, mobile client system 230 may be a smartphone, a personal computer, a laptop computer, a cellular phone, a smartphone, a personal digital assistant, an ultra-mobile PC, a computer tablet, another suitable client system, or two or more such client systems.

In particular embodiments, a mobile check-in system 200 may include one or more displays 290. The display 290 may render, visualize, display, message, and publish to one or more users based on output from a mobile client system 230. Output from the mobile client system 230 can be transmitted to the display 290 by any suitable connection. The display 290 can include any suitable I/O device that can enable communication between a user and display 290. As an example and not by way of limitation, the display 290 can include a video monitor, speaker, touchscreen, printer, another suitable I/O device, or a combination of two or more of these. Although this disclosure describes and FIGS. 2A thru 2G illustrate a display 290 as a particular type of I/O device, this disclosure contemplates a display 290 as any suitable type of I/O device.

In particular embodiments, a mobile check-in system 200 may receive user-input from one or more users via display 290. As an example and not by way of limitation, display 290 may be a type of touchscreen, such as a resistive touchscreen, a capacitive touchscreen, an infrared touchscreen, or another suitable type of touchscreen. The user may click, touch, or otherwise interact with display 290 to select and input commands and to perform other actions. Although this disclosure describes and FIGS. 2A thru 2G illustrate a mobile check-in system 200 receiving user-input via a particular component, this disclosure contemplates mobile check-in system 200 receiving user-input via any suitable I/O interface. As an example and not by way of limitation, mobile check-in system 200 may receive user-input via keyboard, keypad, microphone, monitor, mouse, printer, scanner, speaker, still camera, stylus, tablet, trackball, video camera, another suitable I/O device, or a combination of two or more of these.

In particular embodiments, a mobile check-in system 200 may receive user-input from one or more users via a user interface 240 that is displayed on a display 290. As an example and not by way of limitation, user interface 240 may be a graphic user interface that allows one or more users to interact with the mobile check-in system 200. A user may click, touch, or otherwise interact with the user interface 240 to provide input to the mobile check-in system 200.

The user interface 240 may be generated by any suitable program or application. As an example and not by way of limitation, the user interface 240 may be provided in a structured document and processed by a browser client of the mobile client system 230. A user of a mobile check-in system 200 can use the browser client or other application to access a user interface 240 over a network (such as, for example, network 110). The user interface 240 may be automatically generated and presented to the user in response to the user visiting or accessing the event management system 170, a third-party website, or executing an application on mobile client system 230. As another example and not by way of limitation, the user interface 240 may be provided by a dedicated client application hosted on the mobile client system 230.

In particular embodiments, event management system 170 may transmit data to a mobile client system 230 allowing it to display user interface 240, which may be some type of graphic user interface. As an example and not by way of limitation, a webpage downloaded to mobile client system 230 may include an embedded call that causes mobile client system 230 to download an executable object, such as a Flash .SWF object, which executes on the mobile client system 230 and renders some or all of the user interface 240 within the context of the webpage. Other interface types are possible, such as server-side rendering and the like. User interface 240 may be configured to receive signals from the user via mobile client system 230. As an example and not by way of limitation, a user may touch or click on user interface 240, or enter commands from a keyboard, keypad, or other suitable input device. The mobile client system 230 can respond to these signals and may transmit these signals to the event management system 170. The display of user interface 240 can change based on the output of the event management system 170, the input of the user, or signals from mobile client system 230.

In particular embodiments, a mobile check-in system 200 may include one or more cameras 250. The camera 250 may capture and store images. The camera 250 may support taking photographs, video, or other suitable images. The camera 250 may include a view finder. In particular embodiments, the display 290 may function as a view finder for the camera 250. Images captured by the camera 250 may be stored on the mobile client system 230, transmitted to event management system 170, or transmitted to another suitable system.

In particular embodiments, a mobile check-in system 200 may receive from an event management system 170 one or more event listings. Each event listing corresponds to an event. As an example and not by way of limitation a client application hosted on mobile client system 230 may download one or more files that include the one or more event listings. The mobile client system 230 may also download event information associated with each event listing. The mobile check-in system 200 may receive a particular set of event listings available on the event management system 170. As an example and not by way of limitation, the event management system 170 may transmit event listings associated with a particular event organizer. As another example and not by way of limitation, the event management system 170 may only transmit event listings within a particular date range. Although this disclosure describes a mobile check-in system 200 using particular processes for receiving event listings, this disclosure contemplates a mobile check-in system 200 using any suitable processes for receiving event listings.

In particular embodiments, a mobile check-in system 200 may select an event listing from one or more event listings. As an example and not by way of limitation, a plurality of event listings may be displayed on a display 290. A user 101 may then review the event listings via a user interface 240. The user 101 may then provide input to user interface 240 to select a particular event listing from a plurality of event listings. Although this disclosure describes particular processes for selecting an event listing, this disclosure contemplates any suitable processes for selecting an event listing.

In particular embodiments, a mobile check-in system 200 may receive from an event management system 170 an event attendee list associated with an event. The event attendee list may identify the name, email address, ticket identifier, check-in status, and other suitable attendee information for each attendee registered for the event. The check-in status identifies whether an attendee is checked-in or not checked-in. As an example and not by way of limitation, the event organizer may download the event attendee list from event management system 170 and store the event attendee list locally on client system 130. The event attendee list may be displayed in whole or in part on display 290. A user 101 may then review the event attendee list via a user interface 240. The user 101 may be able to search the event attendee list for particular attendees, such as, for example, searching by name, email address, ticket identifier, or another suitable search parameter. The user 101 may then provide input to user interface 240 to select one or more attendees from the event attendee list. Although this disclosure describes particular systems receiving and transmitting an event attendee list, this disclosure contemplates any suitable systems receiving and transmitting an event attendee list.

In particular embodiments, a mobile check-in system 200 may check-in one or more attendees. The event attendee list may identify the check-in status for each attendee registered for the event. Check-in status may indicate whether an attendee is or is not checked-in at the event. As an example and not by way of limitation, an event attendee list may be displayed in whole or in part on display 290. The event attendee list may indicate that one or more attendees are not checked in. A user 101 may then select one or more of the attendees and change their check-in status to indicate that they are checked-in. In particular embodiments, the mobile check-in system 200 may receiving an indication that the attendee has arrived at an event. As an example and not by way of limitation, a user 101 may access an event attendee list on mobile client system 230 and select an attendee from the list to indicate that an attendee had arrived. As another example and not by way of limitation, a user 101 may access an event attendee list on mobile client system 230, select an attendee from the list, and provide further input to indicate that an attendee had arrived. In particular embodiments, the mobile check-in system 200 may search the event attendee list for the name, email address, or ticket identifier of the attendee and then select the attendee from the event attendee list. As an example and not by way of limitation a user 101 may access an event attendee list on mobile client system 230.

The user 101 may input one or more search criteria into the mobile client system 230. The mobile client system 230 may then search the event attendee list and identify one or more users that match the search criteria. The user 101 may then select one or more attendees from the search results provide by the mobile client system 230. In particular embodiments, the mobile check-in system 200 may scan a ticket for a ticket identifier and identify the attendee based on the ticket identifier. The ticket identifier may be a barcode, a 2D barcode, a QR code, or another suitable scannable identifier. A ticket identifier may be scanned using any suitable scanning device, such as, for example a camera 250, an optical scanner, a barcode scanner, a QR code scanner, or another suitable scanning device. As an example and not by way of limitation, a user 101 may access an event attendee list on mobile client system 230 and then scan one or more ticket identifiers from one or more tickets using camera 250. The mobile client system 230 may then automatically provide an indication that the attendee associated with the scanned ticket identifier has arrived. In particular embodiments, the mobile check-in system 200 may receive the name, email address, or ticket identifier of the attendee from a third mobile client system associated with the attendee and then identify the attendee based on the received name, email address, or ticket identifier. As an example and not by way of limitation, an attendee may transmit a message or signal (such as, for example, an email, text message, or another suitable signal) to a mobile client system 230 containing the attendee's name, email address, or ticket identifier. The mobile client system 230 may then automatically provide an indication that the attendee associated with the name, email address, or ticket identifier has arrived. In particular embodiments, the mobile check-in system 200 may update the check-in status of the attendee to identify that the attendee is checked-in. As an example and not by way of limitation, after receiving an indication that an attendee has arrived at an event, a mobile client system 230 may access an event attendee list and change the check-in status of the attendee from not checked-in to checked-in. Although this disclosure describes checking-in attendees in a particular manner, this disclosure contemplates checking-in attendees in any suitable manner. Moreover, although this disclosure describes checking-in attendees using particular components, this disclosure contemplates checking-in attendees using any suitable components.

In particular embodiments, a mobile check-in system 200 may periodically transmit to an event management system 170 an updated event attendee list identifying the one or more attendees checked-in with the mobile check-in system 200. An event attendee list may be updated as a mobile check-in system 200 changes the check-in status of attendees. As an example and not by way of limitation, a user 101 may access an event attendee list on a mobile client system 230 and update the event attendee list by changing check-in status of one or more attendees to identify that the attendees are checked-in. The mobile client system 230 may then transmit the updated event attendee list to an event management system 170. The mobile client system 230 may transmit the updated event attendee list in whole or in part. As an example and not by way of limitation, the mobile client system 230 may transmit the entire event attendee list, including data that has been updated and data that has not yet changed. As another example and not by way of limitation, the mobile client system 230 may transmit only the part of the event attendee list that has been updated since the last time updates were transmitted to the event management system 170. Updated event attendee lists may be transmitted between a mobile client system 230 and an event management system 170 at any suitable time. As an example and not by way of limitation, a mobile client system 230 may transmit an updated event attendee list after a certain number of attendees have checked-in. As another example and not by way of limitation, a mobile client system 230 may transmit an updated event attendee list after a certain time period has passed (such as, for example, every 1, 5, or 10 minutes). Although this disclosure describes transmitting updated event attendee lists between particular components, this disclosure contemplates transmitting update event attendee lists between any suitable components. Moreover, although this disclosure describes transmitting updated event attendee lists at particular times, this disclosure contemplates transmitting updated event attendee lists at any suitable times.

In particular embodiments, a mobile check-in system 200 may periodically receive from an event management system 170 an updated event attendee list that identifies one or more attendees who have checked-in with one or more other mobile client systems 200. A plurality of mobile check-in systems 200 may be used to check-in attendees into an event. As the mobile check-in systems 200 are used to check-in attendees, the event attendee list on each mobile check-in system 200 may be updated to identify the attendees that are checked-in by that particular mobile check-in system 200. Each mobile check-in system 200 may then transmit its updated event attendee list to the event management system 170. The event management system 170 may then synchronize the updated event attendee lists from the plurality of mobile check-in systems 200 to create a new event attendee list that contains up-to-date check-in status information for each attendee. This new updated event attendee list may then be periodically transmitted back to the mobile check-in systems 200. The event management system 170 may transmit the updated event attendee list in whole or in part. As an example and not by way of limitation, the event management system 170 may transmit the entire event attendee list, including data that has been updated and data that has not yet changed. As another example and not by way of limitation, the event management system 170 may transmit only the part of the event attendee list that has been updated since the last time updates were transmitted to the mobile check-in system 200. Updated event attendee lists may be transmitted to a mobile client system 230 from an event management system 170 at any suitable time. As an example and not by way of limitation, an event management system 170 may transmit an updated event attendee list after a certain number of attendees have checked-in. As another example and not by way of limitation, an event management system 170 may transmit an updated event attendee list after a certain time period has passed (such as, for example, every 1, 5, or 10 minutes). As an example and not by way of limitation a first user 101 on a first mobile client system 230 may check-in a plurality of attendees for an event at the front door to a venue while a second user 101 on a second mobile client system 230 may check-in a plurality of other attendees at the rear door to the venue. The first and second mobile client systems 230 may periodically transmit their updated event attendee lists to an event management system 170. The event management system 170 may then synchronize this information and transmit a new updated event attendee list to the first and second mobile client systems 230. In this way, the first mobile client system 230 may receive event information identifying which attendees have checked-in with the second mobile client system 230 at the rear door to the venue. Similarly, the second mobile client system 230 may receive event information identifying which attendees have checked-in with the first mobile client system 230 at the front door to the venue. This may prevent, for example, an attendee from using a particular ticket at one venue entrance and then attempting to use the ticket again at another venue entrance. Although this disclosure describes transmitting updated event attendee lists between particular components, this disclosure contemplates transmitting update event attendee lists between any suitable components. Moreover, although this disclosure describes synchronizing event attendee lists in a particular manner, this disclosure contemplates synchronizing event attendee lists in any suitable manner. Furthermore, although this disclosure describes transmitting updated event attendee lists at particular times, this disclosure contemplates transmitting updated event attendee lists at any suitable times.

In particular embodiments, a mobile check-in system 200 may have a set or privileges on event management system 170 associated with the event. Privileges on event management system 170 may include, for example, the ability to create or delete event listings, access particular event information, update particular event information, update particular event attendee lists, or perform other suitable actions or processes on event management system 170. Privileges may be associated with a particular system mobile client system 230 or a particular user 101. A plurality of mobile check-in systems 200 may be able to access the event information for a particular event listing, and each mobile check-in system 200 may have a particular set of privileges associated with it. As an example and not by way of limitation, one or more first mobile client systems 230 may have a first set of privileges on event management system 170, and one or more second mobile client systems may have a second set of privileges on event management system 170. The second set of privileges may be a superset, a subset, or independent of the first set of privileges. As another example and not by way of limitation, a first user 101 may be the creator of a particular event listing and may have a first set of privileges on event management system 170 that include the ability to access all event information, including event attendee lists, associated with the particular event listing. One or more second users 101 work as doormen at an event and may have a second set of privileges on event management system 170 that include only the ability to update the check-in status of attendees on the event attendee list for the particular event listing associated with the event. Although this disclosure describes particular users and systems with particular privileges, this disclosure contemplates any suitable users and systems with any suitable privileges.

In particular embodiments, a mobile check-in system 200 may be used to register one or more attendees for an event. A user 101 of a mobile check-in system 200 may be able to register attendees for an event at the door of the event, for example, as the attendees arrive. A user 101 may select an event to register attendees for. The user 101 may then input information needed to register an attendee, such as, for example, the attendee's personal information and billing information. The mobile check-in system 200 may then update the event attendee list to include the new attendee. As an example and not by way of limitation, an attendee may arrive at an event and not be registered for the event. A user 101 may then take the attendee's personal and billing information and input the information into a mobile client system 230. The mobile client system 230 may update the event attendee list associated with the event to include the attendee. In particular embodiments, the mobile check-in system 200 may receive payment from the attendee and then update the event attendee list to include the attendee. The mobile check-in system 200 may receive billing information associated with an attendee and process that billing information to receive payment from the attendee. Billing information may include the user 101's name, address, credit card information, bank account number, PayPal username, and other suitable billing or payment information. The mobile check-in system 200 may also record receipt of cash payment by a user 101. Billing information may be received in any suitable manner. As yet another example and not by way of limitation, an attendee (who may be registered or unregistered) may arrive at an event and not yet have paid to be registered for the event. A user 101 may take the attendee's billing information and manually input the billing information into a mobile client system 230 via the user interface 240. As another example and not by way of limitation, a mobile client system 230 may include a credit card reader, which a user 101 can use to swipe and charge credit cards of attendees. After receiving billing information, a mobile check-in system 200 may then process the billing information to transfer funds as appropriate. Funds may be transferred from a financial account provided by the attendee to another suitable financial account (such as, for example, to a financial account associated with the user 101). As an example and not by way of limitation, a user 101 may input an attendee's credit card information into a mobile client system 230. The mobile client system 230 may transmit credit card transaction information to a bank or credit card processor to process the charge. After the credit card payment is approved by the bank or credit card processor, the mobile client system 230 may update the event attendee list associated with the event to include the attendee. Although this disclosure describes using a mobile check-in system 200 to register for an event in a particular manner, this disclosure contemplates using a mobile check-in system 200 to register for an event in any suitable manner. Moreover, although this disclosure describes a mobile check-in system 200 receiving payment in a particular manner, this disclosure contemplates a mobile check-in system 200 receiving payment in any suitable manner.

Figure 2A:
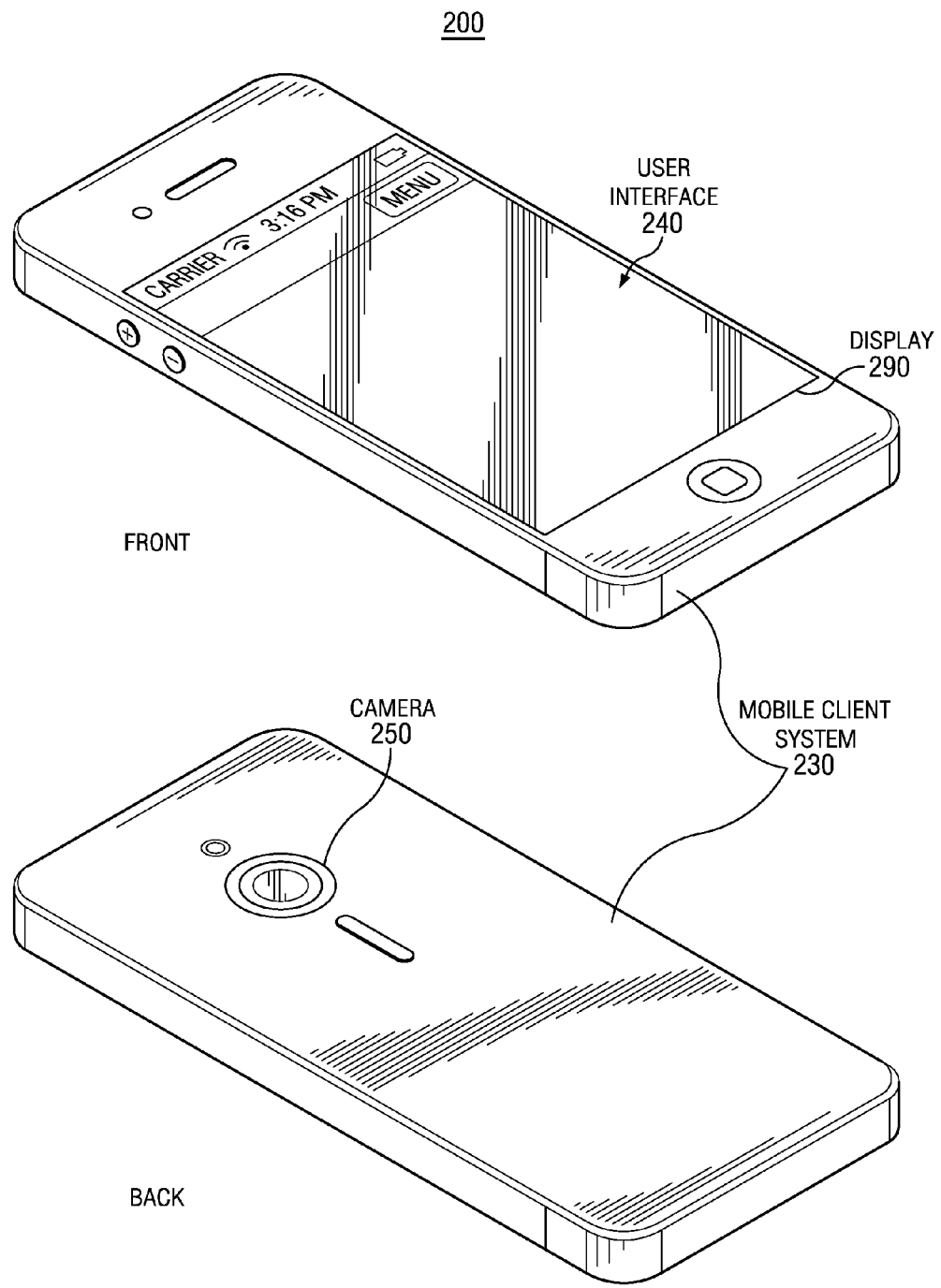
FIG. 2A illustrates an example mobile check-in system.
Figure 2C:
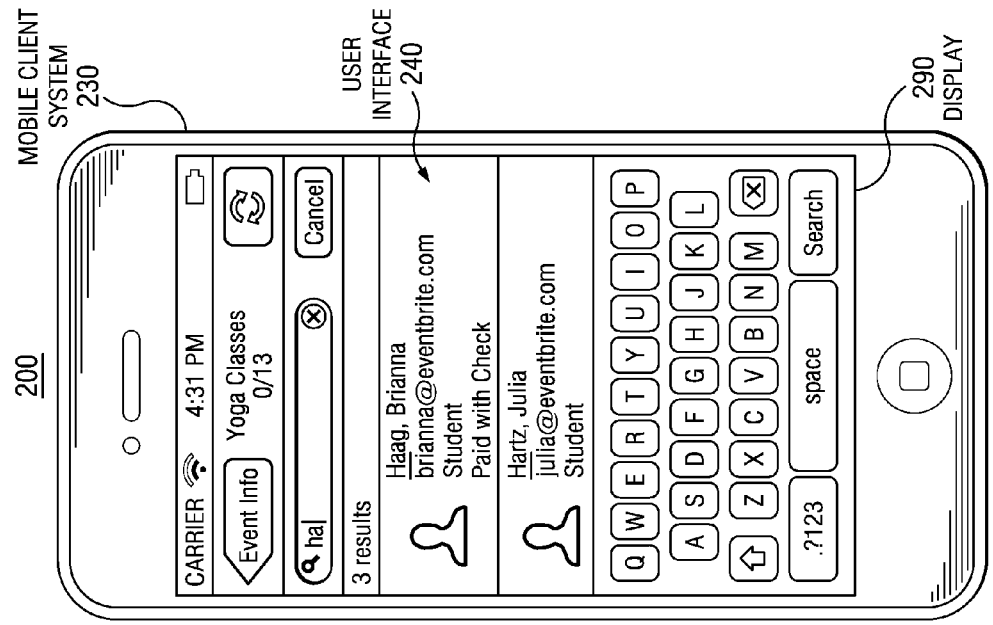
FIG. 2C illustrates an example mobile check-in system.
Figure 2B:
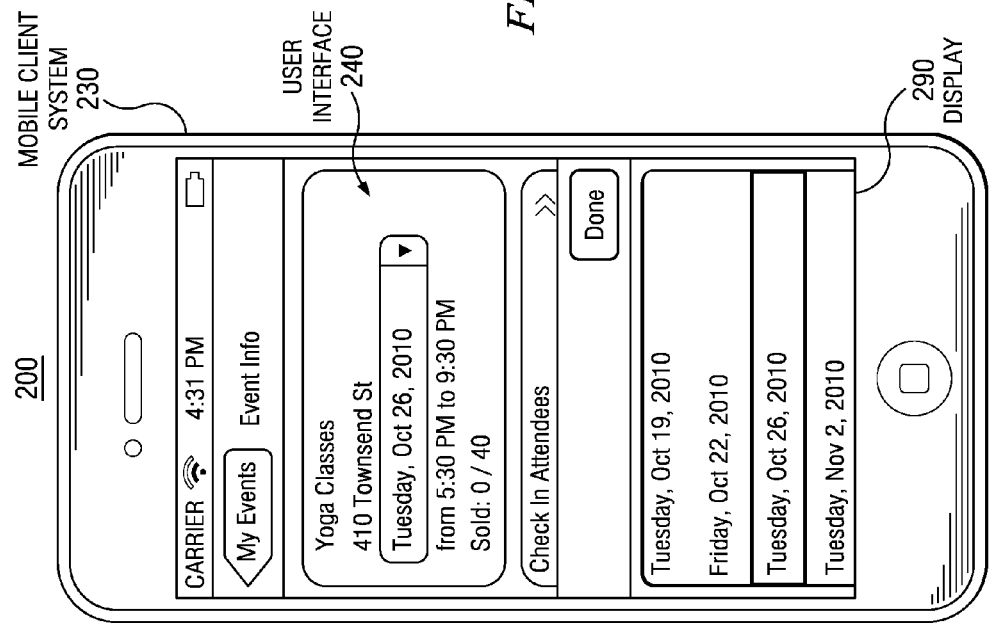
FIG. 2B illustrates an example mobile check-in system.

FIG. 2B illustrates an example of a mobile check-in system 200 accessing an event listing from event management system 170. The user interface 240 displays a plurality of dates that a user 101 can select. The event listings are sorted by date, and the user interface shows only dates where the user 101 is managing an event. A user 101 may touch the user interface 240 to select a particular event listing. In the example illustrated, the date "Tuesday, Oct. 26, 2010" is selected, and the user 101 had "Yoga Classes" on that date. Although FIG. 2B illustrates accessing event listings in a particular manner, this disclosure contemplates accessing event listings in any suitable manner.

FIG. 2C illustrates an example of a mobile check-in system 200 accessing an event attendee list from event management system 170. The user interface 240 includes a search query field and displays part of an event attendee list for an event listing titled "Yoga Classes." The search query field may be used to search for an attendee by name or email address. Here, the user 101 has inputted "ha" into the search query field, which has returned results of attendees with last names beginning with "Ha," two of which are displayed in the user interface 240. Although FIG. 2C illustrates accessing an event attendee list in a particular manner, this disclosure contemplates accessing an event attendee list in any suitable manner.

Figure 2D:
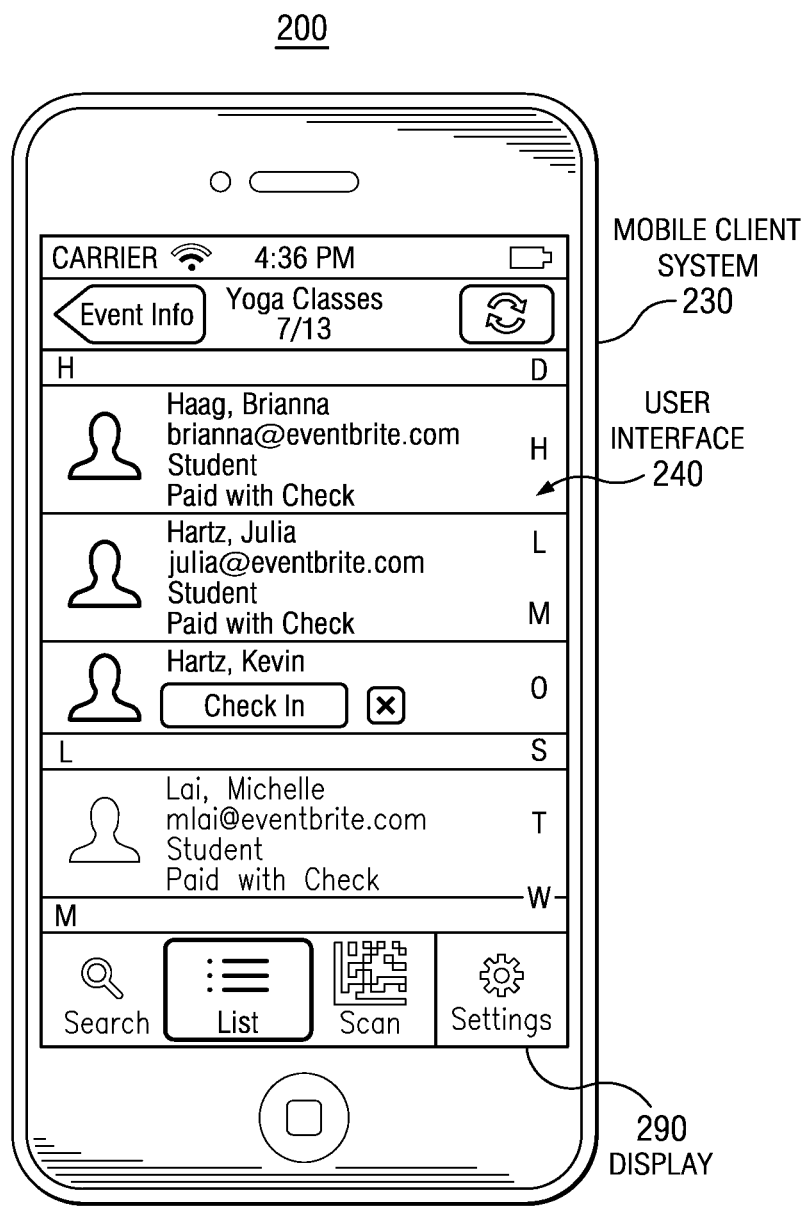
FIG. 2D illustrates an example mobile check-in system.

FIG. 2D illustrates an example of a mobile check-in system 200 checking-in an attendee by manually selecting the attendee from the event attendee list. The user interface 240 displays part of the event attendee list for the "Yoga Classes" event listing. The user 101 can select a particular attendee from the event attendee list to check-in that attendee. Here, the user 101 has selected the attendee "Hartz, Kevin" to check-in. After selecting a particular attendee, the user interface 240 will ask the user 101 to confirm the check-in. Here, the user interface 240 displays a "Check In" icon that the user 101 can click to confirm checking-in "Hartz, Kevin." Although FIG. 2D. illustrates checking-in an attendee in a particular manner, this disclosure contemplates checking-in an attendee in any suitable manner.

Figure 2E:
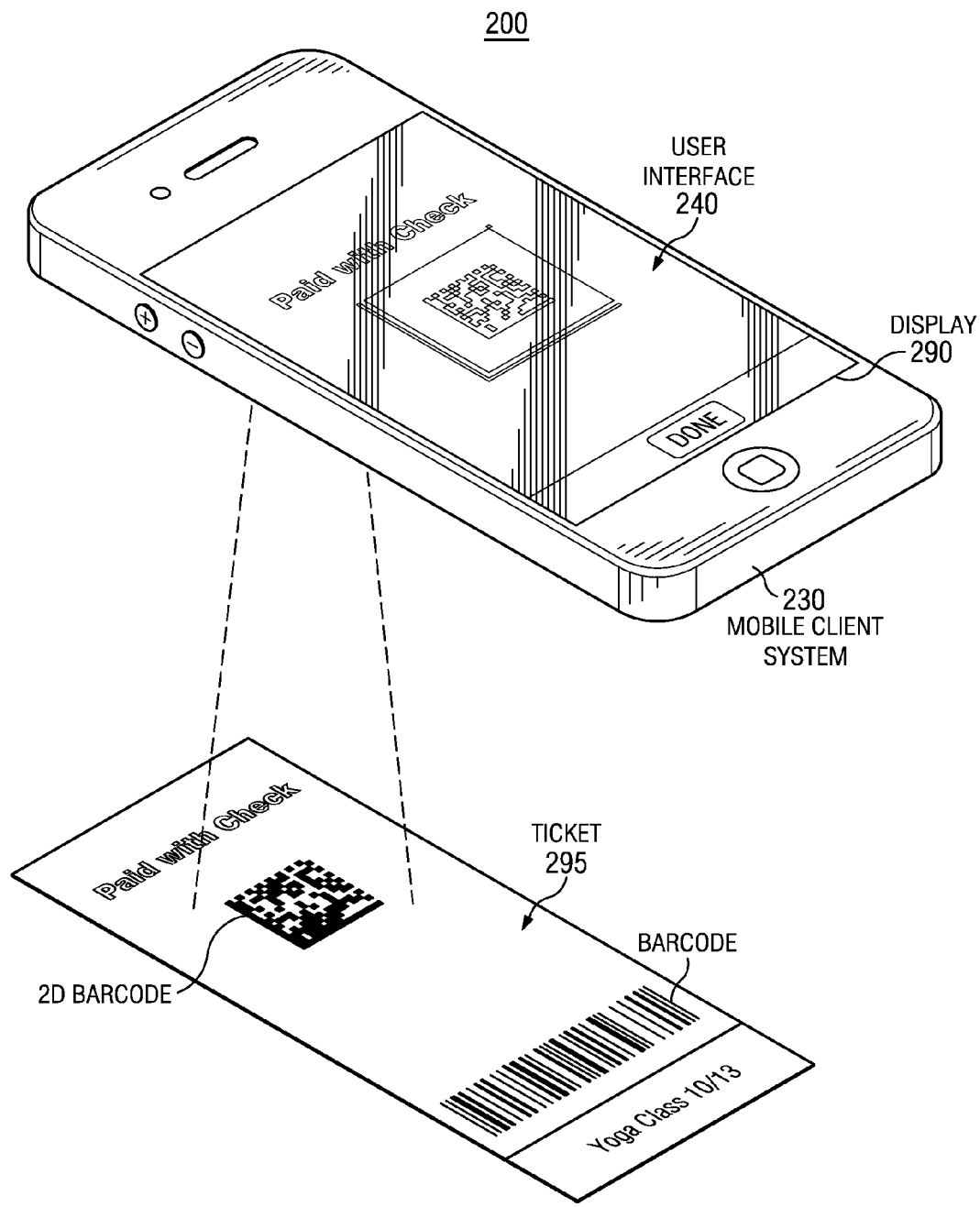
FIG. 2E illustrates an example mobile check-in system.

FIG. 2E illustrates an example of a mobile check-in system 200 scanning a 2D barcode on a ticket 295 with a camera 250. The ticket 295 is for a "Yoga Class" on the date "10/13." The ticket 295 includes both a barcode and a 2D barcode. These barcodes may be scanned by any suitable scanning device. Here, a mobile client system 230 functions as a scanning device. The camera 250 can scan the 2D barcode. Here, the camera 250 is focused on a 2D barcode on the ticket 295. The user interface 240 is functioning as a view finder for the camera 250. The mobile check-in system 200 may automatically scan the 2D barcode once it detects the 2D barcode in the view finder. Although FIG. 2E illustrates scanning a particular ticket in a particular manner, this disclosure contemplates scanning any suitable ticket in any suitable manner.

Figure 2G:
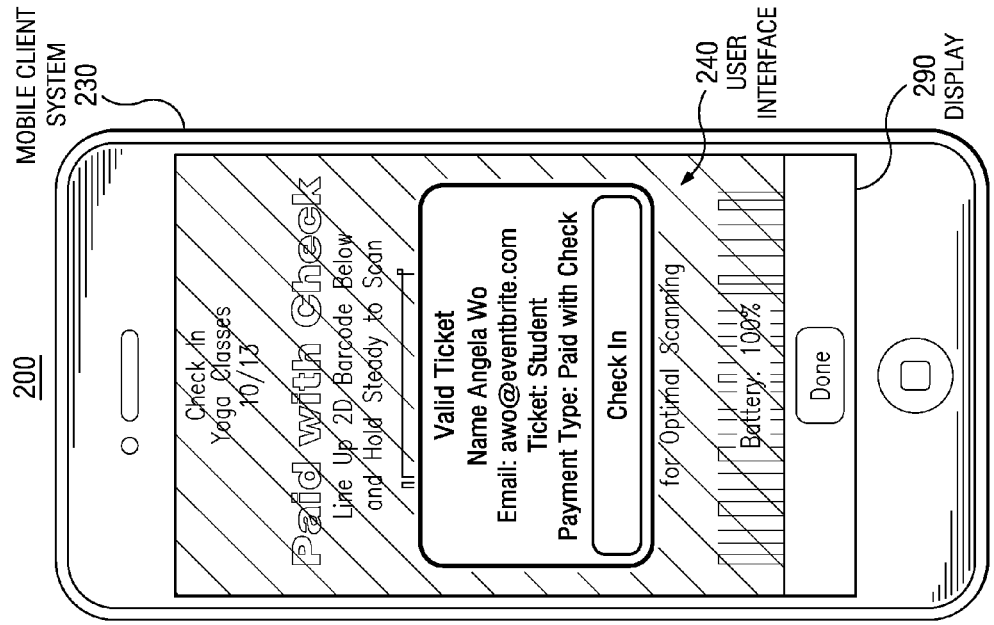
FIG. 2G illustrates an example mobile check-in system.
Figure 2F:
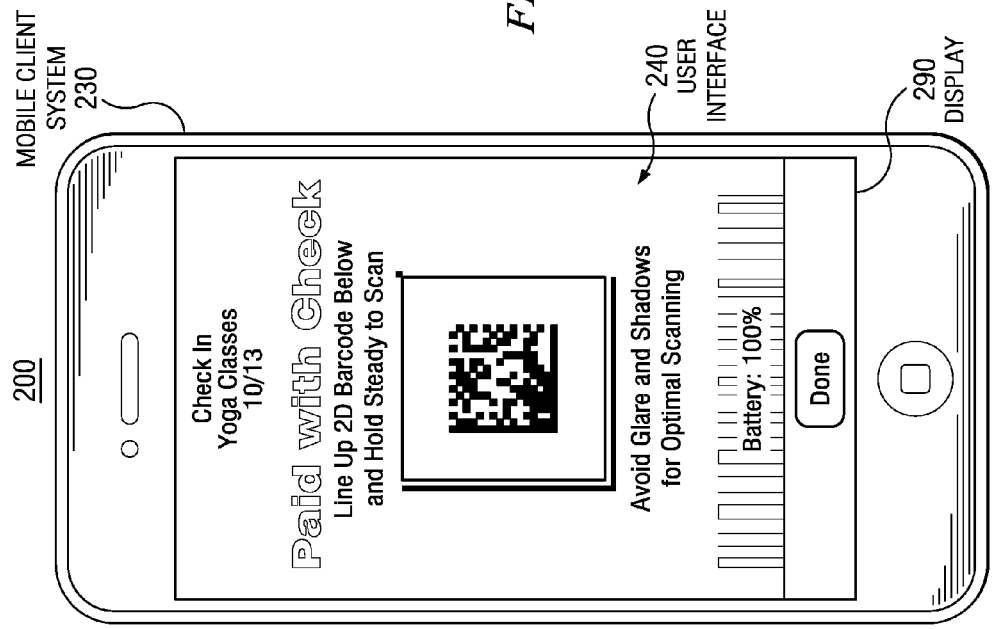
FIG. 2F illustrates an example mobile check-in system.

FIG. 2F illustrates an example of a user interface 240 for a mobile check-in system 200 when checking-in an attendee by scanning a 2D barcode on a ticket. FIG. 2F illustrates a more detailed version of the user interface 240 illustrated in FIG. 2E. The user interface 240 is functioning as a view finder for the camera 250. The ticket 295 from FIG. 2E can be seen on the user interface 240. Overlaying the display from the view finder is text instructing a user 101 how to scan the 2D barcode from the ticket 295. The user 101 may line up the 2D barcode in the view finder and hold the ticket stead and the mobile client system 230 will automatically scan the 2D barcode. Although FIG. 2F illustrates checking-in an attendee by scanning a particular ticket in a particular manner, this disclosure contemplates checking-in an attendee by scanning any suitable ticket in any suitable manner.

FIG. 2G illustrates an example of a mobile check-in system 200 checking-in an attendee by scanning a 2D barcode on a ticket. FIG. 2G illustrates a mobile client system 230 identifying and checking-in an attendee after scanning the 2D barcode from a ticket 295, as illustrated in FIGS. 2E and 2F. After scanning the 2D barcode, the mobile client system 230 identifies the attendee associated with the 2D barcode ticket identifier. The user interface 240 then displays a confirmation window showing that the ticket is valid, and the attendee's name, email address, ticket type, and payment type. A user 101 may then click on "Check In" to check-in the attendee and update the check-in status of the attendee on the event attendee list to identify that the attendee is checked-in. Although FIG. 2G illustrates checking-in a particular attendee by scanning a ticket in a particular manner, this disclosure contemplates checking-in any suitable attendee by scanning a ticket in any suitable manner.

Figure 3:
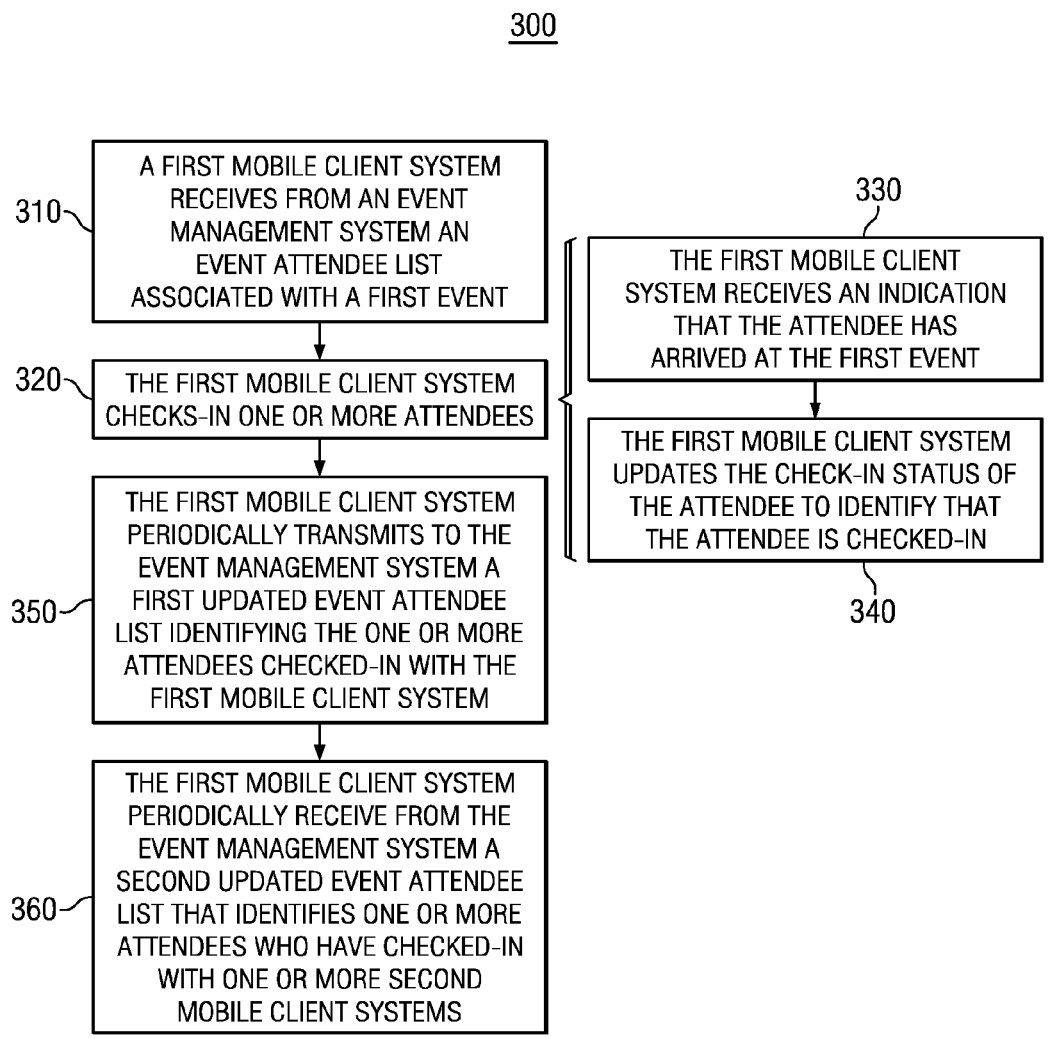
FIG. 3 illustrates an example method for facilitating checking-in one or more attendees with a plurality of mobile check-in systems.

FIG. 3 illustrates an example method for facilitating checking-in one or more attendees with a plurality of mobile check-in systems 200. The method begins at step 310, where a first mobile client system 200 receives from an event management system 170 an event attendee list associated with a first event. The event attendee list identifies the name, email address, ticket identifier, and check-in status of each attendee registered for the first event. The check-in status identifies whether an attendee is checked-in or not checked-in. At step 320, the first mobile client system 200 checks-in one or more attendees. Step 320 may comprise substeps 330 and 340. At substep 330, the first mobile client system 200 receives an indication that the attendee has arrived at the first event. As substep 340, the first mobile client system 200 updates the check-in status of the attendee to identify that the attendee is checked-in. At step 350, the first mobile client system 200 periodically transmits to the event management system 170 a first updated event attendee list identifying the one or more attendees checked-in with the first mobile client system 200. At step 360, the first mobile client system 200 periodically receive from the event management system 170 a second updated event attendee list that identifies one or more attendees who have checked-in with one or more second mobile client systems 200. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Local SQL Files for Mobile Clients

Figure 4:
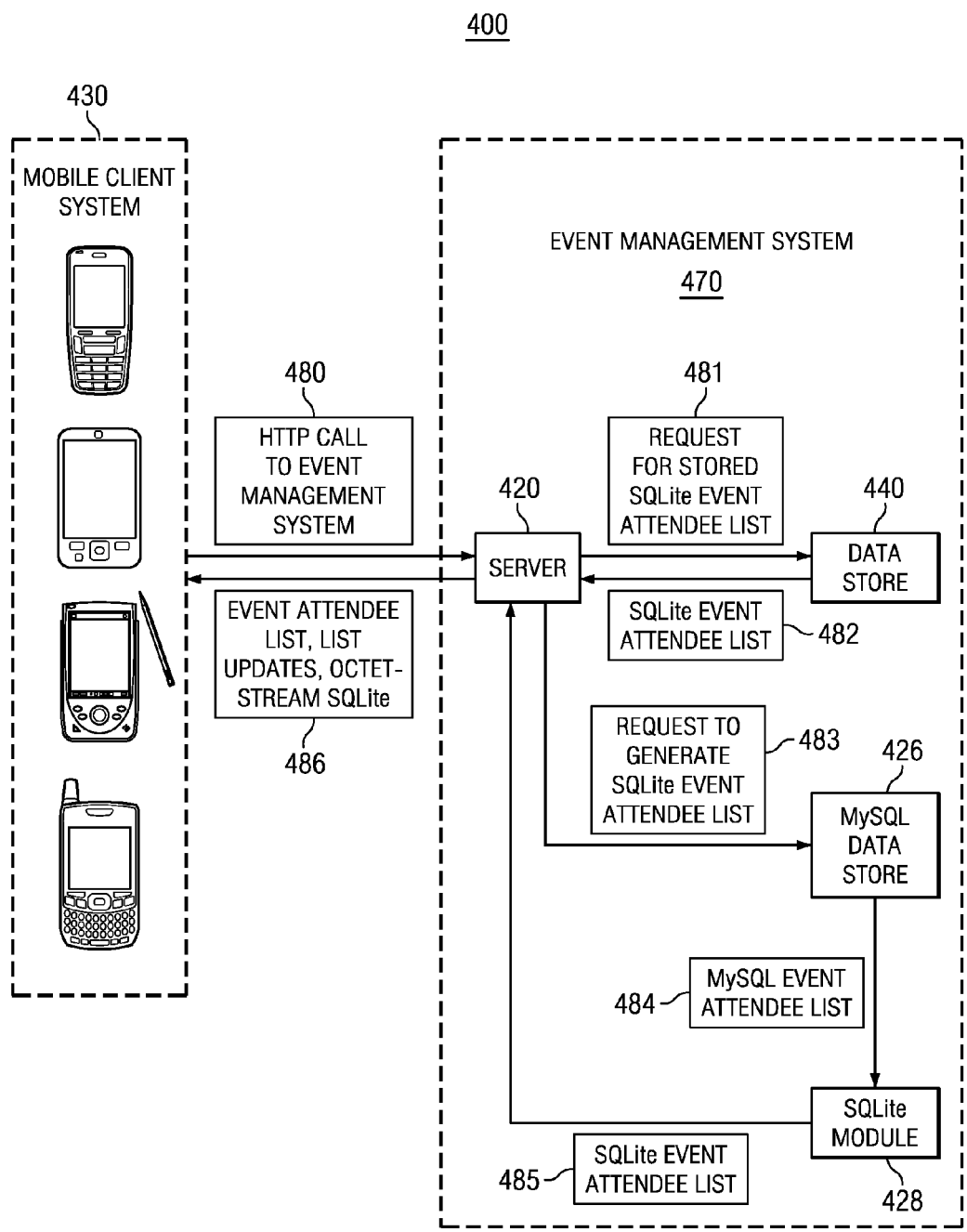
FIG. 4 illustrates an example system for implementing local SQL files for mobile check-in systems.

FIG. 4 illustrates an example system 400 for implementing local SQL files for mobile check-in systems. System 400 includes a mobile client system 430, and an event management system 470. The mobile client system 430 and the event management system 470 may be connected to each other by a suitable network (such as, for example, network 110) or directly. The event management system 470 may include a server 420, a data store 440, a MySQL data store 426, and a SQLite module 428. Although FIG. 4 illustrates a particular arrangement of mobile client system 430, event management system 470, server 420, data store 440, MySQL data store 426, and SQLite module 428, this disclosure contemplates any suitable arrangement of mobile client system 430, event management system 470, server 420, data store 440, MySQL data store 426, and SQLite module 428. As another example and not by way of limitation, two or more of server 420, data store 440, MySQL data store 426, and SQLite module 428 may be physically or logically co-located with each other in whole or in part. Moreover, although FIG. 4 illustrates a particular number of mobile client systems 430, event management systems 470, servers 420, data stores 440, MySQL data stores 426, and SQLite modules 428, this disclosure contemplates any suitable number of mobile client systems 430, event management systems 470, servers 420, data stores 440, MySQL data stores 426, and SQLite modules 428. As an example and not by way of limitation, system 100 may include multiple mobile client systems 430, event management systems 470, servers 420, data stores 440, MySQL data stores 426, and SQLite modules 428.

In particular embodiments, an event management system 470 may be a network-addressable computing system that can host one or more event organization and management systems. An event management system 470 may generate, store, receive, and transmit event-related data, such as, for example, event listings, event details, event history details, event registration details, event organizer details, event attendee details, ticket purchase details, attendee check-in details, and event displays. An event management system 470 may be accessed by the other components of system 400, either directly or via a suitable network. Each subcomponent of event management system 470 (i.e., server 420, data store 440, MySQL data store 426, and SQLite module 428) may be accessed by other components of system 400, either directly or via a suitable network. In particular embodiments, a server 420 may be any suitable server, such as, for example, a server 920. A data store 440 and a MySQL data store 426 may be any suitable data stores, such as, for example, a data store 940. In particular embodiments, mobile client system 230 may be a network-addressable mobile computing system that can host one or more applications. A mobile client system 430 may access, send data to, and receive data from an event management system 470. A mobile client system 430 may access an event management system 470 directly, via a suitable network, or via a third-party system. Although this disclosure describes and FIG. 4 illustrates a mobile client system 430 as a particular type of client system, this disclosure contemplates a mobile client system 430 as any suitable type of client system. As an example and not by way of limitation, mobile client system 430 may be a smartphone, a personal computer, a laptop computer, a cellular phone, a smartphone, a personal digital assistant, an ultra-mobile PC, a computer tablet, another suitable client system, or two or more such client systems.

In particular embodiments, event management system 470 may have one or more servers 420 that can communicate with one or more mobile client systems 430 over a suitable network (such as, for example, network 110). As an example and not by way of limitation, event management system 470 may have an internet server for communicating with one or more client systems 430 via the Internet. As another example and not by way of limitation, event management system 470 can have a mobile server for communicating with one or more mobile client systems 430 via a mobile network (e.g., GSM, PCS, Wi-Fi, WPAN, etc.). As yet another example, event management system 470 may have one server that can communicate with one or more client systems 430 over both the Internet and a mobile network. Communication between event management system 470 and mobile client system 430 may occur over any appropriate electronic communication medium or network using any suitable communications protocols. As an example and not by way of limitation, mobile client system 430 and server 420 may include Transport Control Protocol/Internet Protocol (TCP/IP) networking stacks to provide for datagram and transport functions. Of course, any other suitable network and transport layer protocols can be utilized.

In particular embodiments, a mobile client system 430 may communicate with event management system 470 to receive webpages, messages, event attendee list updates, transmit data to and receive data from event management system 470. In a similar fashion, event management system 470 can communicate data packets, including HTTP packets, data requests, databases, event attendee lists, event attendee list updates, transaction information, updates, etc.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as JSON, SQL, XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. As an example and not by way of limitation, a client request may cause a server to respond with a first data object, such as an HTML page, which itself refers to other data objects. A client application, such as a browser, may request these additional data objects as it parses or otherwise processes the first data object.

In particular embodiments, an event management system 470 may receive a request from a mobile client system 430 for an event attendee list. The request from the mobile client system 430 may be in any suitable format. The request may be received by server 420. As an example and not by way of limitation, the request from the mobile client system 430 may be a HTTP request message using an application programming interface (API) for the event management system 470. As an example and not by way of limitation, a mobile client system 430 may send the following HTTP request to event management system 470: http://www.eventbrite.com/jsoniphone/event_get_iphone_file?user_key=1279989274-5326696292&app_key=NzFmZDBhZDMwMDk5&show_full_barcodes=true&id=786079184&do_not_display=profile,answers,address.
Although this disclosure describes receiving a particular request from a mobile client system 430, this disclosure contemplates receiving any suitable request from a mobile client system 430.

In particular embodiments, the event attendee list may be stored as a database. The event attendee list may include information describing one or more of the attendees registered to attend an event, include the attendee's name, phone number, mailing address, email address, ticket order information, payment information, ticket information, check-in status, and other suitable attendee information. The event attendee list may also include information describing the check-in status of an attendee. Check-in status may indicate whether an attendee is or is not checked-in at the event. The event attendee list database may be structured such that there is an entry for each order identifier. Each ticket purchase order may be associated with a particular order identifier, which may be any suitable identifying information. Each order identifier may be associated with one or more attendee identifiers. A user 101 may purchase tickets for an event for himself or others attendees. Each attendee may be associated with a particular attendee identifier, which may be any suitable identifying information. Each attendee identifier may be associated with one or more ticket identifier. An attendee may have one or more tickets. Each ticket may be associated with a particular ticket identifier, which may be any suitable identifying information (such as, for example, a barcode number). In summary, each order identifier may be associated with one or more attendee identifiers, which may be associated with one or more ticket identifiers. In other words, the order identifier→attendee identifier→ticket identifier relationship is a 1→many→many relationship. Each ticket identifier may be associated with a check-in status, which indicates whether or not the ticket associated with the ticket identifier is checked-in or not checked-in. In particular embodiments, the event attendee list may be a SQLite database. SQLite is an embedded SQL database engine. Unlike some SQL databases, SQLite does not have a separate server process. SQLite reads and writes directly to ordinary disk files. A complete SQL database with multiple tables, indices, triggers, and views, is contained in a single disk file. Although this disclosure describes an event attendee list as a particular type of database, this disclosure contemplates an event attendee list as any suitable type of database. As an example and not by way of limitation, an event attendee list may be an Oracle database, a Postgres database, or another suitable type of database. Moreover, although this disclosure describes an event attendee list with a particular database structure, this disclosure contemplates an event attendee list with any suitable database structure.

In particular embodiments, an event management system 470 may transmit a request to a data store 440 for an event attendee list that is a SQLite database. The request may be transmitted by server 420. If the event attendee list is available on the data store 440 in a SQLite format, the data store 440 will respond to the request by transmitting the event attendee list to the server 420. If the server receives an event attendee list that is a SQLite database from a data store 440, the data store 440 may then transmit the event attendee list to a mobile client system 430. However, if the event attendee list is not available on the data store 440 in a SQLite format, the data store 440 will respond by transmitting a message to the server 420 indicating the event attendee list is not available. Although this disclosure describes requesting an event attendee list in a particular manner, this disclosure contemplates requesting an event attendee list in any suitable manner.

In particular embodiments, an event management system 470 may transmit a request to a MySQL data store 426 for an event attendee list if the event attendee list is not available on a data store 440. The request may be transmitted by server 420. In particular embodiments, the event attendee list may be stored as a MySQL database on MySQL data store 426. MySQL is a relational database management system (RDBMS) that runs as a server providing multi-user access to a number of databases. MySQL is designed for hosting any size of database on a server which may be accessed by a website or an application. Because MySQL is a separate server process and can be run standalone on a server, it typically requires more resources than SQLite. Although this disclosure describes an event attendee list as a particular type of database, this disclosure contemplates an event attendee list as any suitable type of database. Moreover, although this disclosure describes an event attendee list with a particular database structure, this disclosure contemplates an event attendee list with any suitable database structure.

In particular embodiments, a MySQL data store 426 may transmit an event attendee list that is a MySQL database to a SQLite module 428. The SQLite module 428 may convert the event attendee list from a MySQL database into a SQLite database. The SQLite module 428 may be any suitable SQLite converter tool. As an example and not by way of limitation, the SQLite module 428 may be database-API wrapper written in the Python programming language. Although this disclosure describes converting an event attendee list from a MySQL database into a SQLite database in a particular manner, this disclosure contemplates converting an event attendee list from a MySQL database into a SQLite database in any suitable manner. In particular embodiments, once the SQLite module 428 has converted the event attendee list into a SQLite database, the SQLite module 428 may transmit the event attendee list to a server 420.

In particular embodiments, once an event management system 470 receives an event attendee list that is a SQLite database, the event management system 470 may transmit an event attendee list that is a SQLite database to a mobile client system 430. The request may be transmitted by server 420. The event attendee list may be transmitted in any suitable manner. As an example and not by way of limitation, the event attendee list may be transmitted as an HTTP octet-stream via network 110 to one or more mobile client systems 430. Although this disclosure describes transmitting an event attendee list in a particular manner, this disclosure contemplates transmitting an event attendee list in any suitable manner. Moreover, although this disclosure describes transmitting an event attendee list with a particular format, this disclosure contemplates transmitting an event attendee list with any suitable format. As an example and not by way of limitation, an event attendee list may be transmitted as an SQLite database, a binary plist, an XML file, a text file, or another suitable file type.

In particular embodiments, an event management system 470 periodically receive from a mobile client system 430 an event attendee list update. An event attendee list may be updated as a mobile client system 430 changes the check-in status of attendees. The event attendee list update may identify one or more attendees checked-in with the mobile client system 430 since the last time the mobile client system 430 transmitted an event attendee list update. In particular embodiments, the event attendee list update may be an API call. As an example and not by way of limitation, a mobile client system 430 may transmit the following API call to event management system 470: http://www.eventbrite.com/jsoniphone/barcode_update?user_key=1271095466-4137157349&barcode=1112979514895461001-used-2-Browse-2010Z12Z21.23:56:12,1112932514894896001-used-2-Browse-2010Z12Z21.23:56:44&device_id=iPhone:%20iphonedemo@eventbrite.com&event_id=651310086&date_modified=2010-12-22%2007:56:44&app_key=NzFmZDBhZDMwMDk5.

In particular embodiments, the event attendee list update may be a JSON string. The mobile client system 430 may then transmit the following JSON sting to event management system 470:
{
barcodes={
    id="1112932514894896001,1112979514895461001";
    message="Barcodes updated";
    status=OK;
    };
}.
Although this disclosure describes receiving a particular event attendee list update from a mobile client system 430, this disclosure contemplates receiving any suitable event attendee list update from a mobile client system 430. Event attendee list updates may be transmitted between a mobile client system 430 and an event management system 470 at any suitable time. As an example and not by way of limitation, a mobile client system 430 may transmit an event attendee list update after a certain number of attendees have checked-in. As another example and not by way of limitation, a mobile client system 430 may transmit an event attendee list update after a certain time period has passed (such as, for example, every 1, 5, or 10 minutes). Although this disclosure describes transmitting updated event attendee lists between particular components, this disclosure contemplates transmitting update event attendee lists between any suitable components. Moreover, although this disclosure describes transmitting event attendee list updates at particular times, this disclosure contemplates transmitting event attendee list updates at any suitable times.

In particular embodiments, an event management system 470 periodically transmit to a first mobile client system 430 an event attendee list update. The event attendee list update may identify one or more attendees who have checked-in with one or more second mobile client systems 430 since the last time the first mobile client system 430 receive an event attendee list update. In particular embodiments, the event attendee list update may be a JSON string. As an example and not by way of limitation, an event management system 470 may transmit the following JSON sting to a first mobile client system 430:

```
{
  barcodes =  (
    {
      barcode =    {
        "attendee_id" = 14894896;
        "checkin_method" = Browse;
        "checkin_type" = 2;
        "date_created" = "2010-04-19 17:22:27";
        "date_modified" = "2010-12-22 08:03:00";
        "device_id" = "iPhone: iphonedemo@eventbrite.com";
        id = 1112932514894896001;
        status = unused;
      };
    },
    {
      barcode =    {
        "attendee_id" = 30220599;
        "checkin_method" = "<null>";
        "checkin_type" = 0;
        "date_created" = "2010-12-22 08:02:56";
        "date_modified" = "2010-12-22 08:02:56";
        "device_id" = "<null>";
        id = 2338872730220599001;
        status = unused;
      };
    },
    {
      "attendee_summary" =    (
        {
          "attendee_quantity" = 78;
          "checkedin_quantity" = 51;
        }
      );
      summary =    (
        {
          count = 2;
        },
        {
          "count-unused" = 2;
        }
      );
    }
  );
  "new_attendees" =  (
    {
      attendee =    {
        created = "2010-12-22 00:02:45";
        email = "iphonedemo@eventbrite.com";
        "event_date" = "";
        "first_name" = Buford;
        id = 30220599;
        "last_name" = Taylor;
        "order_id" = 23388727;
        "payment_type" = "payment type";
        price = "0.00 USD";
        quantity = 1;
        status = 100;
        "ticket_class" = "Sample Ticket";
      };
    }
  );
  "new_barcodes" =  (
    {
      barcode =    {
        "attendee_id" = 30220599;
        "checkin_method" = "<null>";
        "checkin_type" = 0;
        "date_created" = "2010-12-22 08:02:56";
        "date_modified" = "2010-12-22 08:02:56";
        "device_id" = "<null>";
        id = 2338872730220599001;
        status = unused;
      };
    }
  );
}.
```

Although this disclosure describes transmitting a particular event attendee list update to a mobile client system 430, this disclosure contemplates transmitting any suitable event attendee list update to a mobile client system 430. Event attendee list updates may be transmitted between an event management system 470 and a mobile client system 430 at any suitable time. As an example and not by way of limitation, an event management system 470 may transmit an event attendee list update after receiving a certain number of event attendee list updates from a plurality of mobile client systems 430. As another example and not by way of limitation, an event management system 470 may transmit an event attendee list update after a certain time period has passed (such as, for example, every 1, 5, or 10 minutes). As yet another example and not by way of limitation, an event management system 470 may transmit an event attendee list update after receiving a request from a mobile client system 430. Although this disclosure describes transmitting updated event attendee lists between particular components, this disclosure contemplates transmitting update event attendee lists between any suitable components. Moreover, although this disclosure describes transmitting event attendee list updates at particular times, this disclosure contemplates transmitting event attendee list updates at any suitable times.

Figure 5:
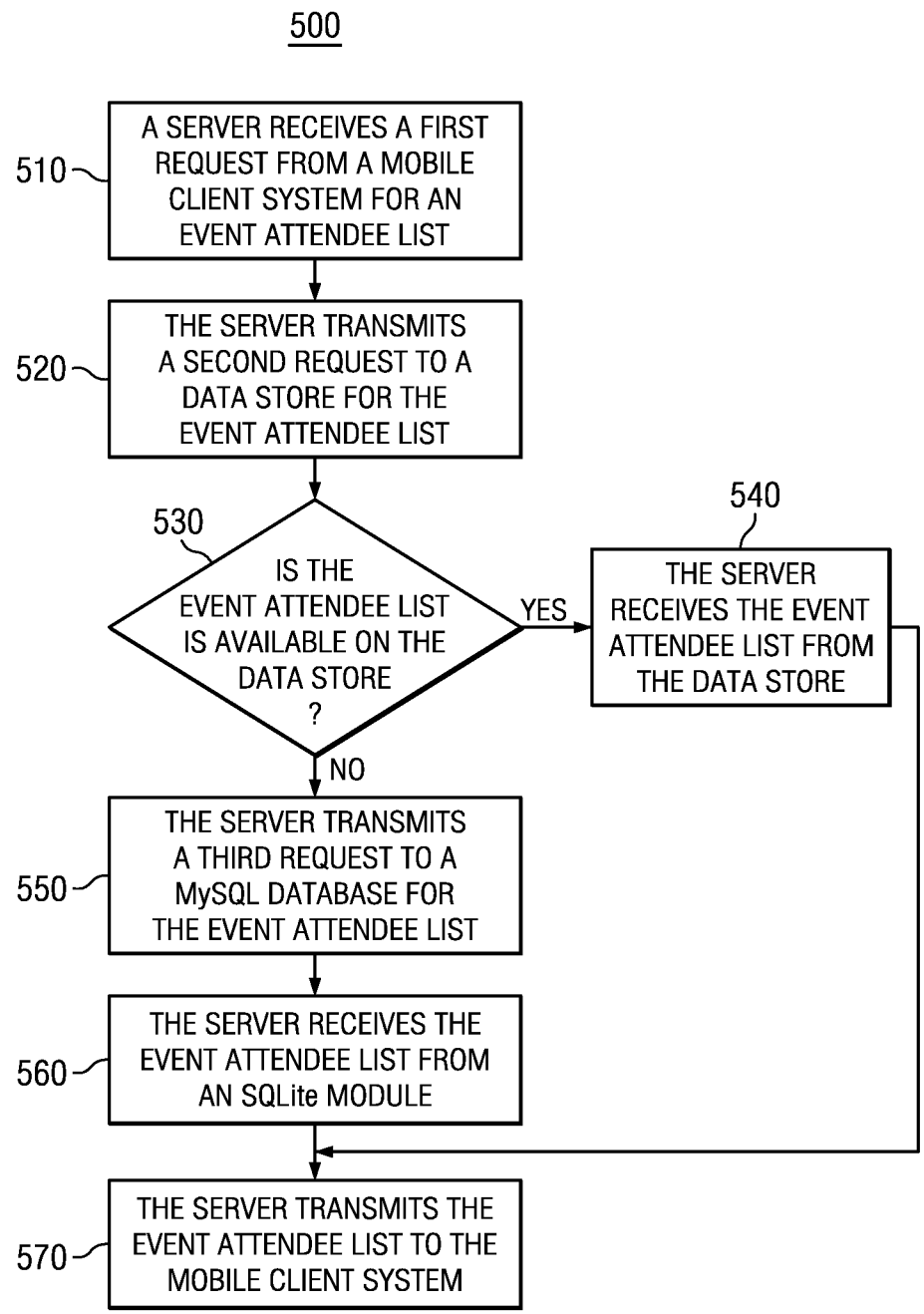
FIG. 5 illustrates an example method for managing requests for event attendee lists from mobile check-in systems.

FIG. 5 illustrates an example method 500 for managing requests for event attendee lists from mobile check-in systems. The method begins at step 510, where a server 420 receives a first request from a mobile client system 430 for an event attendee list. The event attendee list is stored as a SQLite database and the event attendee list identifies whether an attendee is checked-in or not checked-in. At step 520, the server 420 transmits a second request to a data store 440 for the event attendee list. If the event attendee list is available on the data store 440, the data store 440 will transmit the event attendee list to the server 420. If the event attendee list is not available on the data store 440, the data store 440 will transmit a message to the server 420 indicating the event attendee list is not available. At step 530, the server 420 will determine if the event attendee list is available on the data store 440. If the event attendee list is available on the data store 440, then the server 420 receives the event attendee list from the data store 440 at step 540. But if the event attendee list is not available on the data store 440, then the server 420 transmits a third request to a MySQL data store 426 for the event attendee list at step 550. The MySQL data store 426 then transmits an event attendee list that is a MySQL database to a SQLite module 428. The SQLite module 428 converts the event attendee list into a SQLite database. At step 560, the server 420 receives the event attendee list from the SQLite module 428. At step 570, the server 420 transmits the event attendee list to the mobile client system 430. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Real-Time Attendance Reporting

FIG. 6A thru 6J illustrate example attendance reports. In particular embodiments, an attendance report may show real-time information regarding event information, event registration information, and event attendee list information. An event management system 170 may receive real-time check-in information as attendees check-in at an event. The attendees may be checked-in by a plurality of mobile client system 130. The event management system 170 may then generate a variety of attendance reports based on the information in the event attendee updates. Although this disclosure describes particular attendance reports showing particular information, this disclosure contemplates any suitable attendance reports showing any suitable information.

In particular embodiments, an attendance report may be generated by a software application that may be executed on any system (such as, for example, client system 130 or event management system 170). FIGS. 6A thru 6J illustrate a webpage-based application accessed from browser client 610, however any suitable application on any suitable client system may be used. In particular embodiments, a user 101 of event management system 170 may use browser client 610 to access user interface 620 over a network 110. User interface 620 may be automatically generated and presented to the user 101 in response to the user 101 visiting or accessing a website or executing an application on a suitable client system 130 with a suitable browser client 610. An event management system 170 may transmit data to the client system 130, allowing it to display the user interface 620, which is typically some type of graphic user interface. As an example and not by way of limitation, a webpage downloaded to the client system 130 may include an embedded call that causes the client system 130 to download an executable object, such as a Flash .SWF object, which executes on the client system 130 and renders one or more components of the interface within the context of the webpage. Other interface types are possible, such as server-side rendering and the like. User interface 620 is configured to receive signals from the user via the client system. For example, the user may click on user interface 620, or enter commands from a keyboard or other suitable input device. As an example and not by way of limitation, a user 101 selects a type of attendance report for event management system 170 to display. A user 101 may also customize the display of each report, such as, for example, by selecting the time range for the attendance report to display data from.

Figure 6A:
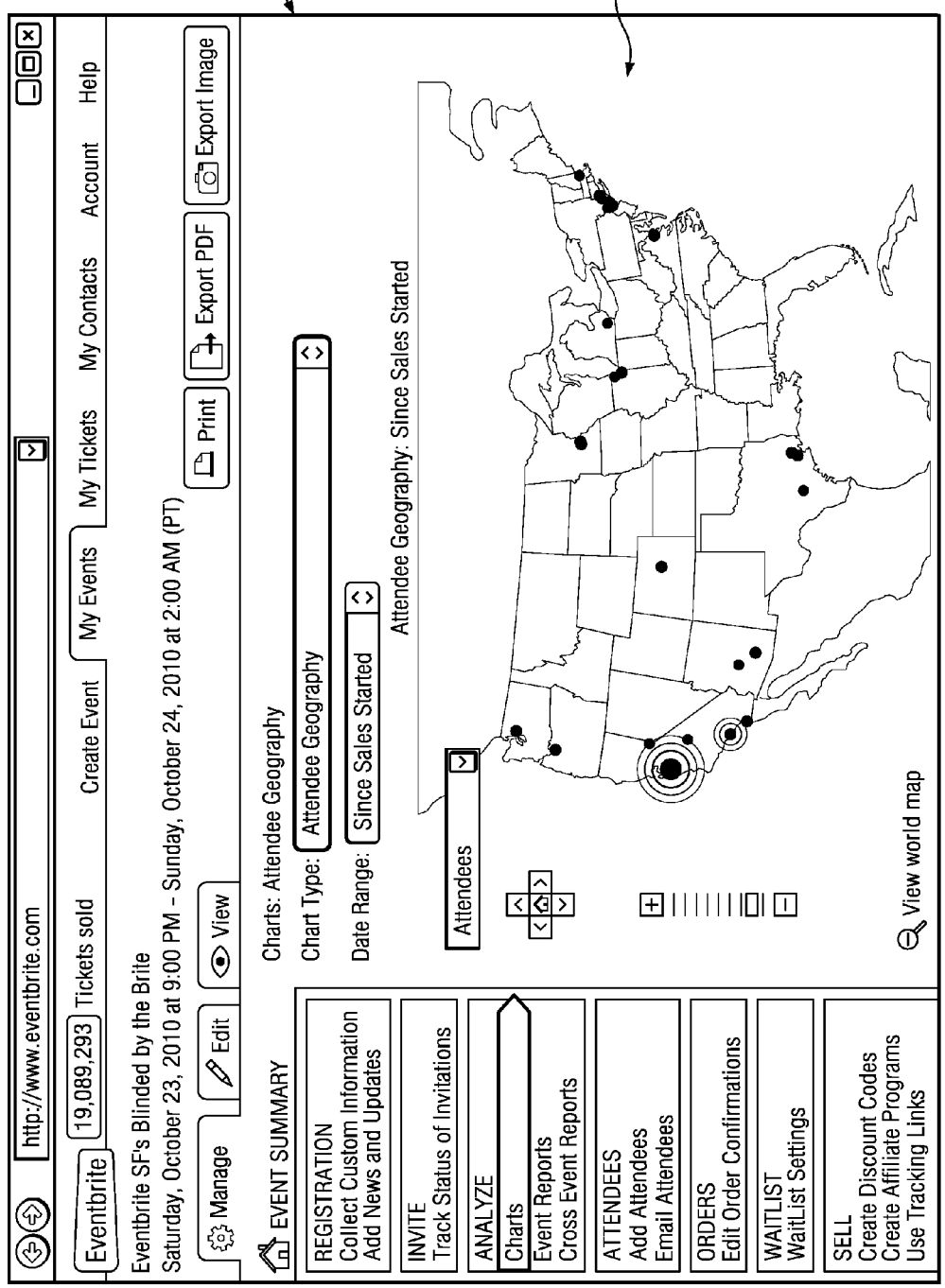
FIG. 6A illustrates an example attendance report.

FIG. 6A illustrates an example attendance report showing ticket sales by attendee location. The user interface 620 displays a map showing the geographic location of attendees and the approximate number of attendees from each geographic location. The geographic location of an attendee may be determined by querying the attendee, from the attendee's financial or personal information, by examining the IP address of the attendee when he accesses event management system 170, or by other suitable methods. Here, locations with more attendees are shown as larger dots. A user 101 may select a particular time range from which to display ticket sales. Here, the user 101 has selected "Since Sales Started," or in other words to show all ticket sales, however any suitable time range may be used. Although FIG. 6A illustrates an attendance report showing particular ticket sales by attendee location, this disclosure contemplates an attendance report showing any suitable ticket sales by attendee location. Moreover, although FIG. 6A illustrates an attendance report showing ticket sales by attendee location using a particular graphic display, this disclosure contemplates an attendance report showing ticket sales by attendee location using any suitable graphic display.

Figure 6B:
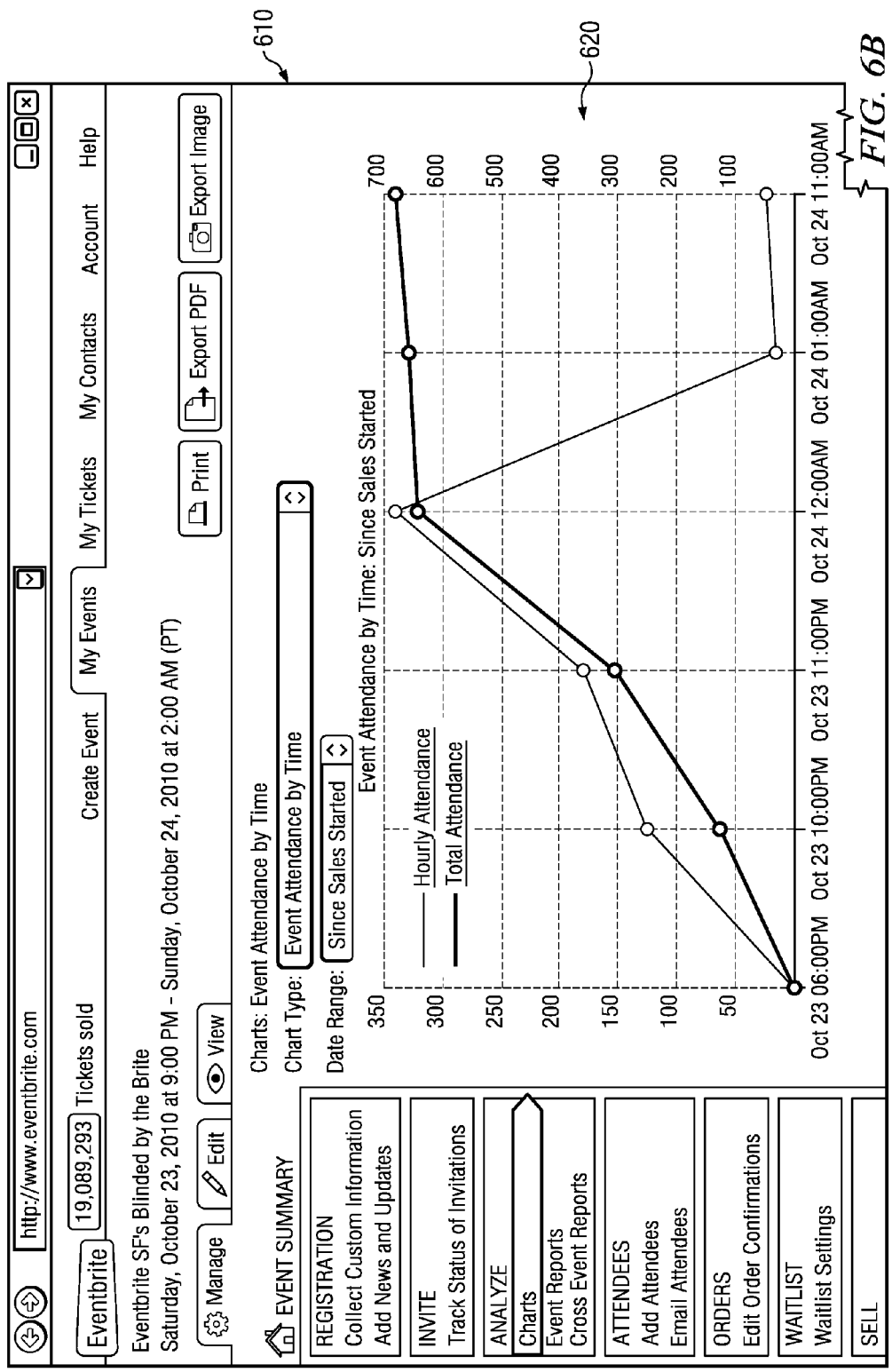
FIG. 6B illustrates an example attendance report.

FIG. 6B illustrates an example attendance report showing the number of attendees checked-in at an event over time. The attendees may be checked-in by a mobile client system 130 used by a user 101 at the event. The user interface 620 displays a chart showing the number of attendees that have checked-in during a series of time ranges, and also the total number of attendees that have checked-in all the time ranges. Here, the thin line shows the number of attendees that checked-in each hour, while the thick line shows the total number of attendees that have checked-in over all the time ranges. In particular embodiments, a user 101 may select to show the number of attendees checked-in at a particular location at an event over time. As an example and not by way of limitation, an attendance report may show the number of attendees who checked-in at the front-door of the venue for an event over time. A user 101 may select a particular time range from which to display the number of attendees checked-in at the event. Here, the user 101 has selected "Since Sales Started," or in other words to show all attendee check-ins, however any suitable time range may be used. Although FIG. 6B illustrates an attendance report showing a particular number of attendees checking-in during particular time ranges, this disclosure contemplates an attendance report showing any suitable number of attendees checking-in during any suitable time ranges. Moreover, although FIG. 6B illustrates an attendance report showing the number of attendees checked-in over time using a particular graphic display, this disclosure contemplates an attendance report showing the number of attendees checked-in over time using any suitable graphic display.

Figure 6C:
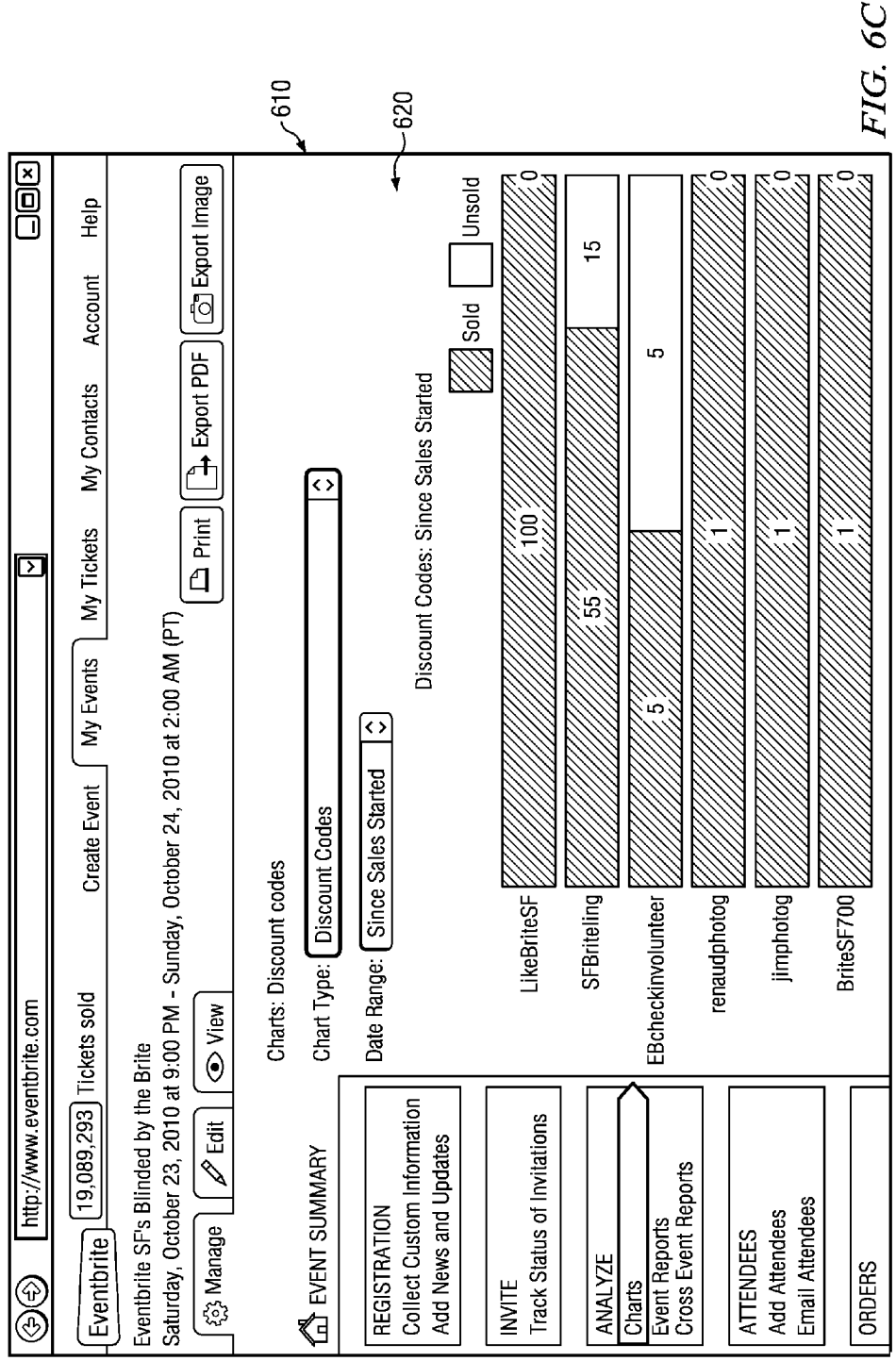
FIG. 6C illustrates an example attendance report.

FIG. 6C illustrates an example attendance report showing ticket sales by discount code used during a plurality of ticket orders. An attendee may use one or more discount codes when purchasing a ticket for an event on an event management system 170. Here, the user interface 620 displays six different discount codes and the number of times each discount code has been use to purchase a ticket. For particular discount codes, the user interface 620 shows that the discount codes may be used only a limited number of times. As an example and not by way of limitation, the "SFBriteling" discount code may only be used 70 times, and currently 55 tickets have sold using the "SFBriteling" discount code. A user 101 may select a particular time range from which to display ticket sales by discount code used during the ticket order. Here, the user 101 has selected "Since Sales Started," or in other words to show all ticket sales by discount code used during the ticket order, however any suitable time range may be used. Although FIG. 6C illustrates an attendance report showing ticket sales with particular discount codes, this disclosure contemplates an attendance report showing ticket sales with any suitable discount codes. Moreover, although FIG. 6C illustrates an attendance report showing ticket sales by discount code using a particular graphic display, this disclosure contemplates an attendance report showing ticket sales by discount code using any suitable graphic display.

Figure 6D:
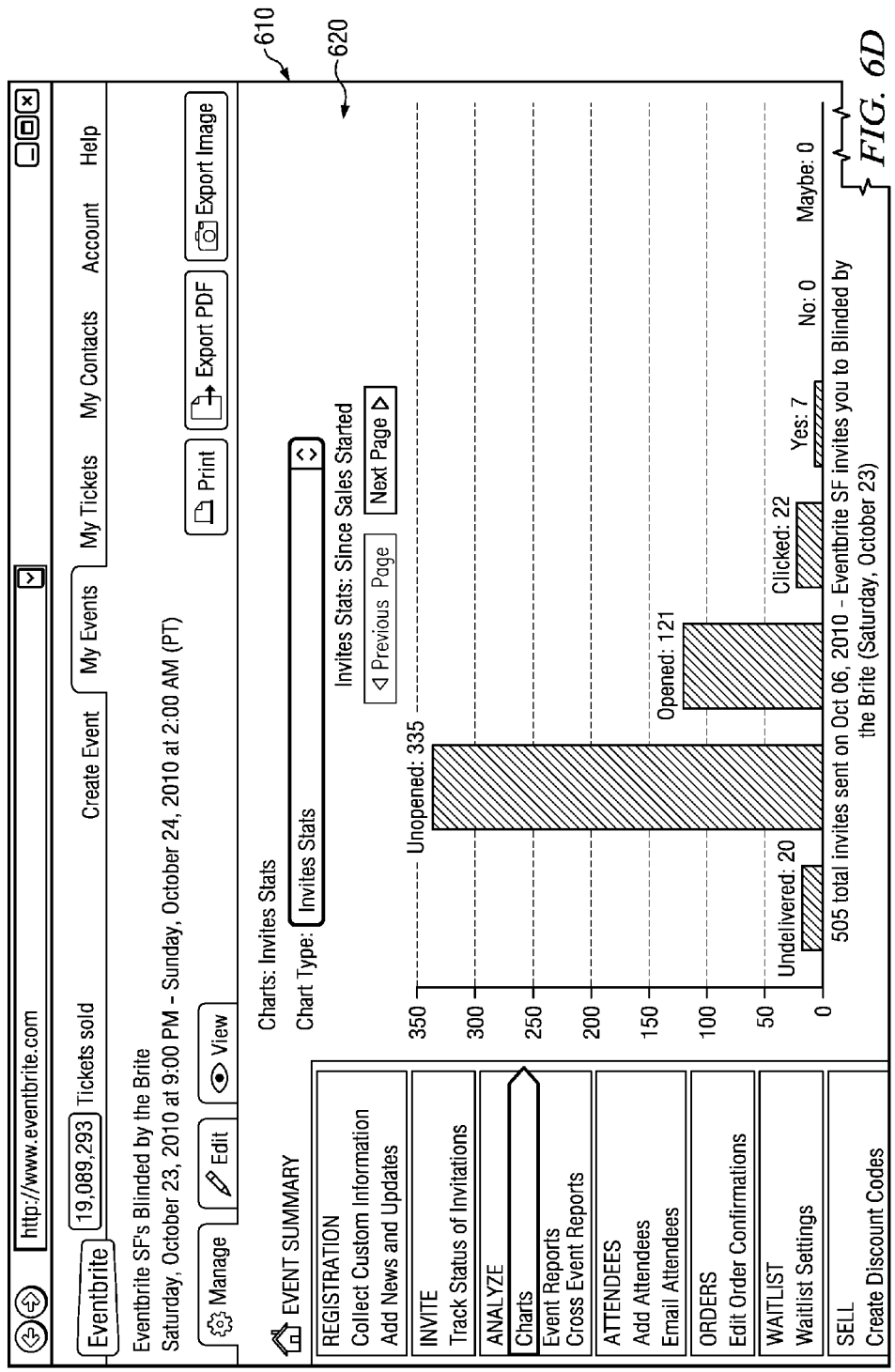
FIG. 6D illustrates an example attendance report.

FIG. 6D illustrates an example attendance report showing event invitation information. In particular embodiments, a user 101 may create an event listing on event management system 170. The user 101 may then have event management system 170 transmit electronic invitations to the event to one or more attendees. The invitations may be in any suitable message format, such as, for example, email, SMS text, MMS text, or another suitable message format. The event management system 170 may report the number of invitations sent, delivered, opened, clicked-thru, event registrations, and other suitable invitation information. As an example and not by way of limitation, FIG. 6D illustrates a user interface 620 displaying the results of sending out 505 invitations for the event "Blinded by the Brite." Of the 505 invitations, 20 were undelivered, meaning they were not successfully transmitted to an email address provided by the user 101. 335 invitations were unopened, meaning they were successfully emailed, but the recipient did not open the email. 121 invitations were opened. 22 invitations were clicked-thru, meaning the recipient opened the email and clicked on a link embedded in the email. After clicking-thru on the invitation, the attendee's browser client 610 may be directed to a webpage where the attendee can register for the event (such as, for example, by indicating where they plan to attend the event by inputting "Yes," "No," or "Maybe"). 7 attendees registered for the event by inputting "Yes" to indicate they would attend. A user 101 may select a particular time range from which to display event invitation information. Here, the user 101 has selected "Since Sales Started," or in other words to show all event invitation information, however any suitable time range may be used. Although FIG. 6D illustrates an attendance report showing particular event invitation information, this disclosure contemplates an attendance report showing any suitable event invitation information. Moreover, although FIG. 6D illustrates an attendance report showing event invitation information using a particular graphic display, this disclosure contemplates an attendance report showing event invitation information using any suitable graphic display.

Figure 6E:
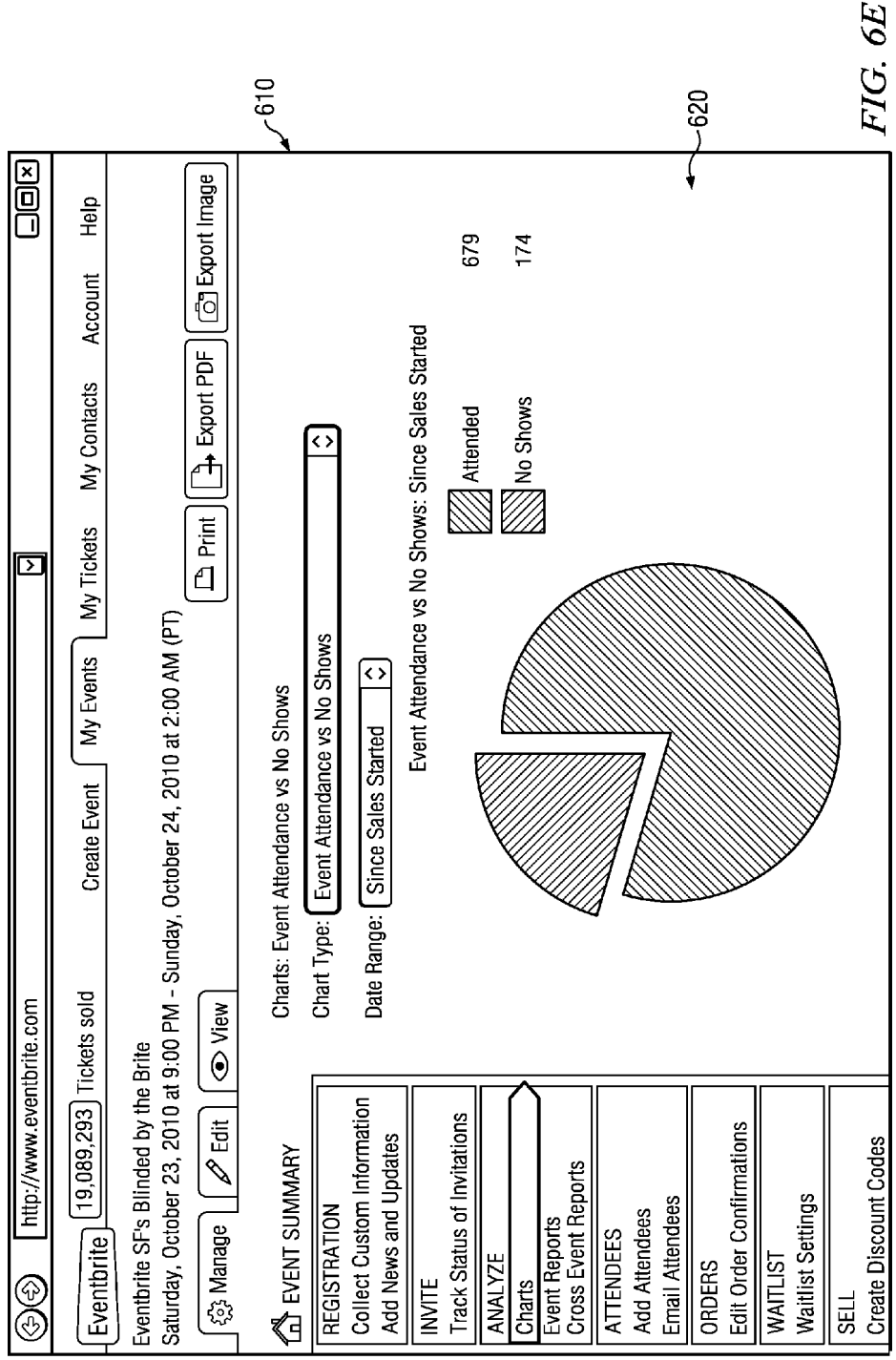
FIG. 6E illustrates an example attendance report.

FIG. 6E illustrates an example attendance report showing actual event attendance as a function of the number of attendees registered to attend an event. An event management system 170 may determine the total number of attendees who attended an event and the total number of attendees who did not attend an event (or have yet to attend). In other words, event management system 170 may display an attendance report showing the number of attendees checked-in and the number of attendees not checked-in. As an example and not by way of limitation, FIG. 6E illustrates a user interface 620 displaying the attendance results for the event "Blinded by the Brite." 679 people registered for the event actually attended, while 174 people registered for the event did not attend ("no shows"). In other words, 679 attendees checked-in and 174 attendees did not check-in. A user 101 may select a particular time range from which to display check-in information. Here, the user 101 has selected "Since Sales Started," or in other words to show all check-in information, however any suitable time range may be used. Although FIG. 6E illustrates an attendance report showing particular check-in information, this disclosure contemplates an attendance report showing any suitable check-in information. Moreover, although FIG. 6E illustrates an attendance report showing check-in information using a particular graphic display, this disclosure contemplates an attendance report showing check-in information using any suitable graphic display.

Figure 6F:
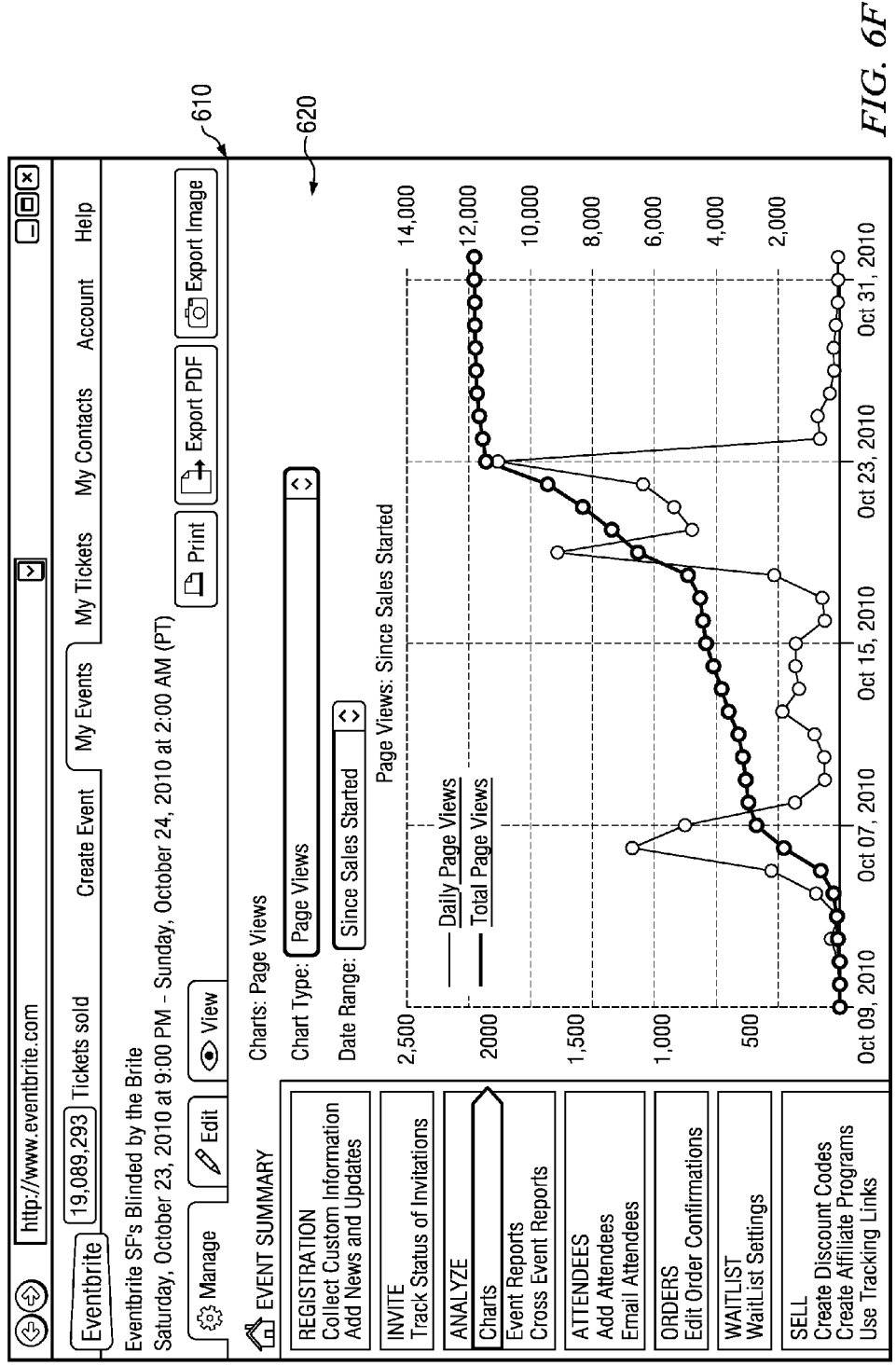
FIG. 6F illustrates an example attendance report.

FIG. 6F illustrates an example attendance report showing event listing page views over time. A user 101 may access event management system 170 to view an event listing associated with a particular event. The user interface 620 displays a chart showing the number of users 101 that have viewed the event listing during a series of time ranges, and also the total number of users 101 that have viewed the event listing in all the time ranges. Here, the thin line shows the number of users 101 that viewed the event listing each day, while the thick line shows the total number of attendees that have viewed the event listing over all the time ranges. A user 101 may select a particular time range from which to display event listing page views over time. Here, the user 101 has selected "Since Sales Started," or in other words to show all page views, however any suitable time range may be used. Although FIG. 6F illustrates an attendance report showing particular page views over times, this disclosure contemplates an attendance report showing any suitable page views over time. Moreover, although FIG. 6F illustrates an attendance report showing page views over time using a particular graphic display, this disclosure contemplates an attendance report showing page views over time using any suitable graphic display.

Figure 6G:
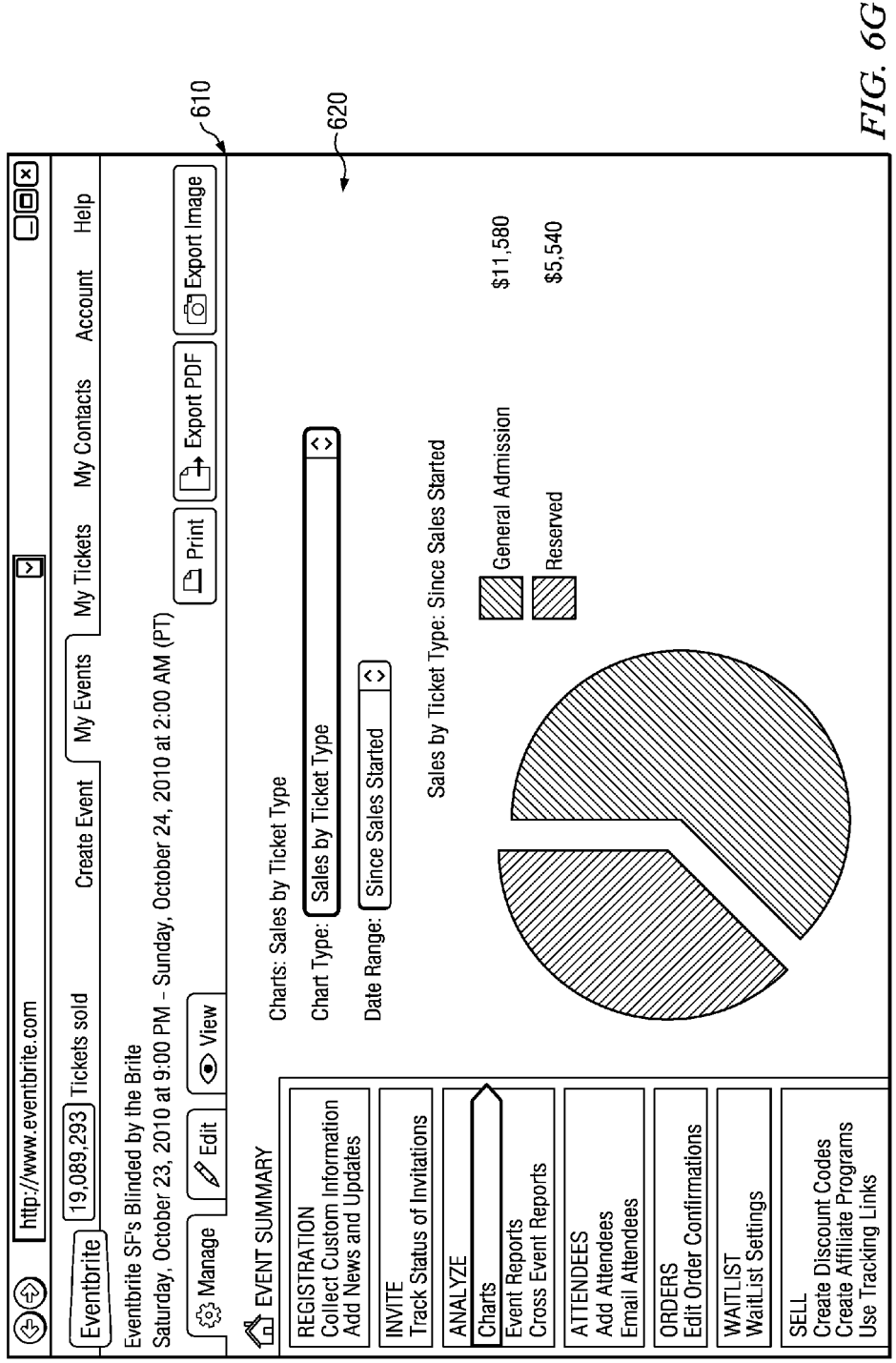
FIG. 6G illustrates an example attendance report.

FIG. 6G illustrates an example attendance report showing ticket sales by ticket type. An event may have one or more types of tickets available for the event. As an example and not by way of limitation, a venue may have particular sections, wherein certain sections are more expensive than other sections. Here, the user interface 620 displays two ticket types, "Reserved" and "General Admission," and the dollar value sales for each ticket type. Although FIG. 6G illustrates a user interface 620 showing ticket sales by dollar amount, this disclosure contemplates showing ticket sales in any suitable manner. As an example and not by way of limitation, ticket sales by ticket type may be shown with respect to the number of tickets sold for each ticket type. A user 101 may select a particular time range from which to display ticket sales by ticket type. Here, the user 101 has selected "Since Sales Started," or in other words to show all ticket sales by ticket type, however any suitable time range may be used. Although FIG. 6G illustrates an attendance report showing particular ticket types, this disclosure contemplates an attendance report showing any suitable ticket types. Moreover, although FIG. 6G illustrates an attendance report showing ticket sales by ticket type using a particular graphic display, this disclosure contemplates an attendance report showing ticket sales by ticket type using any suitable graphic display.

Figure 6H:
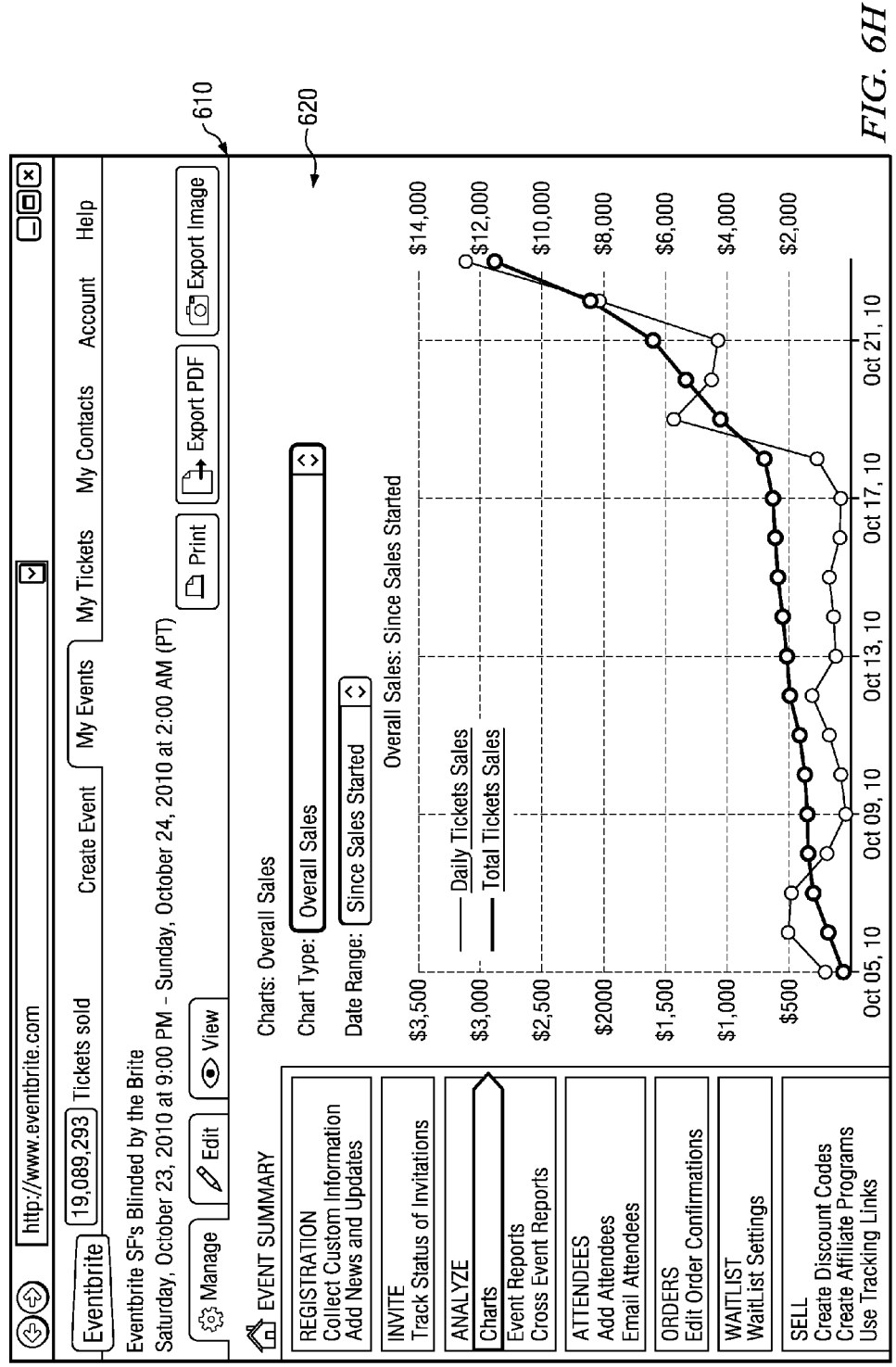
FIG. 6H illustrates an example attendance report.

FIG. 6H illustrates an example attendance report showing ticket sales over time. The user interface 620 displays a chart showing the dollar value of ticket sales during a series of time ranges, and also the total dollar value of ticket sales in all the time ranges. Here, the thin line shows the dollar value of ticket sales each day, while the thick line shows the total dollar value of ticket sales over all the time ranges. Although FIG. 6H illustrates a user interface 620 showing ticket sales by dollar amount, this disclosure contemplates showing ticket sales in any suitable manner. As an example and not by way of limitation, ticket sales over time may be shown with respect to the number of tickets sold over time. A user 101 may select a particular time range from which to display ticket sales over time. Here, the user 101 has selected "Since Sales Started," or in other words to show all ticket sales over time, however any suitable time range may be used. Although FIG. 6H illustrates an attendance report showing particular ticket sales over time, this disclosure contemplates an attendance report showing any suitable ticket sales over time. Moreover, although FIG. 6H illustrates an attendance report showing ticket sales over time using a particular graphic display, this disclosure contemplates an attendance report showing ticket sales over time using any suitable graphic display.

Figure 6I:
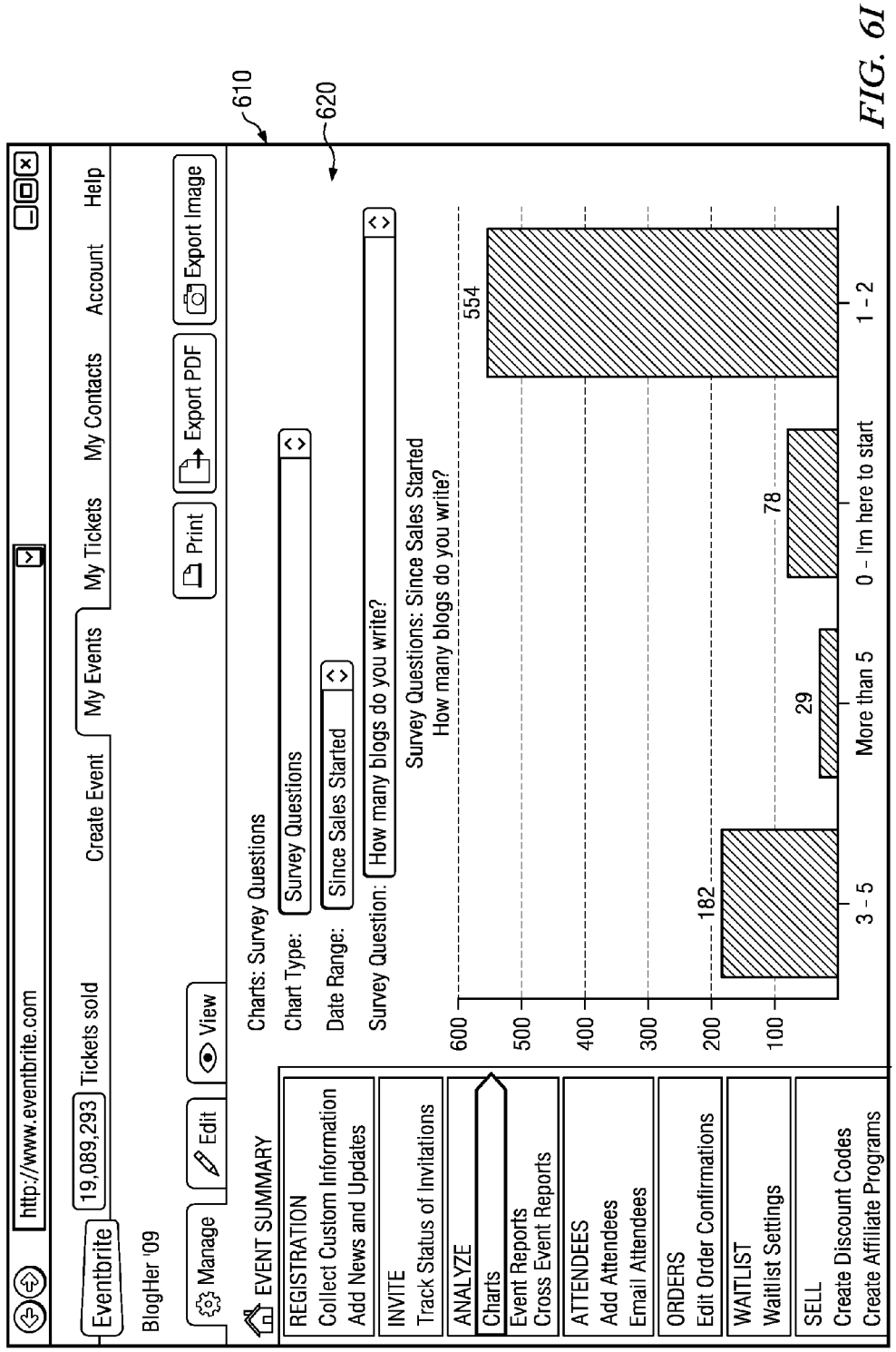
FIG. 6I illustrates an example attendance report.

FIG. 6I illustrates an example attendance report showing a questionnaire results associated with a questionnaire given during the ticket order process. In particular embodiments, event management system 170 may present a survey or questionnaire to a user 101 during or after the ticket order process. Here, user interface 620 shows the results of a survey that asked users 101 "How many blogs do you write?" The survey had four answers to choose from, "0—I'm here to start," "1-2," "3-5," and "More than 5." A user 101 may select a particular time range from which to display questionnaire results. Here, the user 101 has selected "Since Sales Started," or in other words to show all questionnaire results, however any suitable time range may be used. Although FIG. 6I illustrates an attendance report showing the results from a particular questionnaire, this disclosure contemplates an attendance report showing from any suitable questionnaire. Moreover, although FIG. 6I illustrates an attendance report showing questionnaire results using a particular graphic display, this disclosure contemplates an attendance report showing questionnaire results using any suitable graphic display.

Figure 6J:
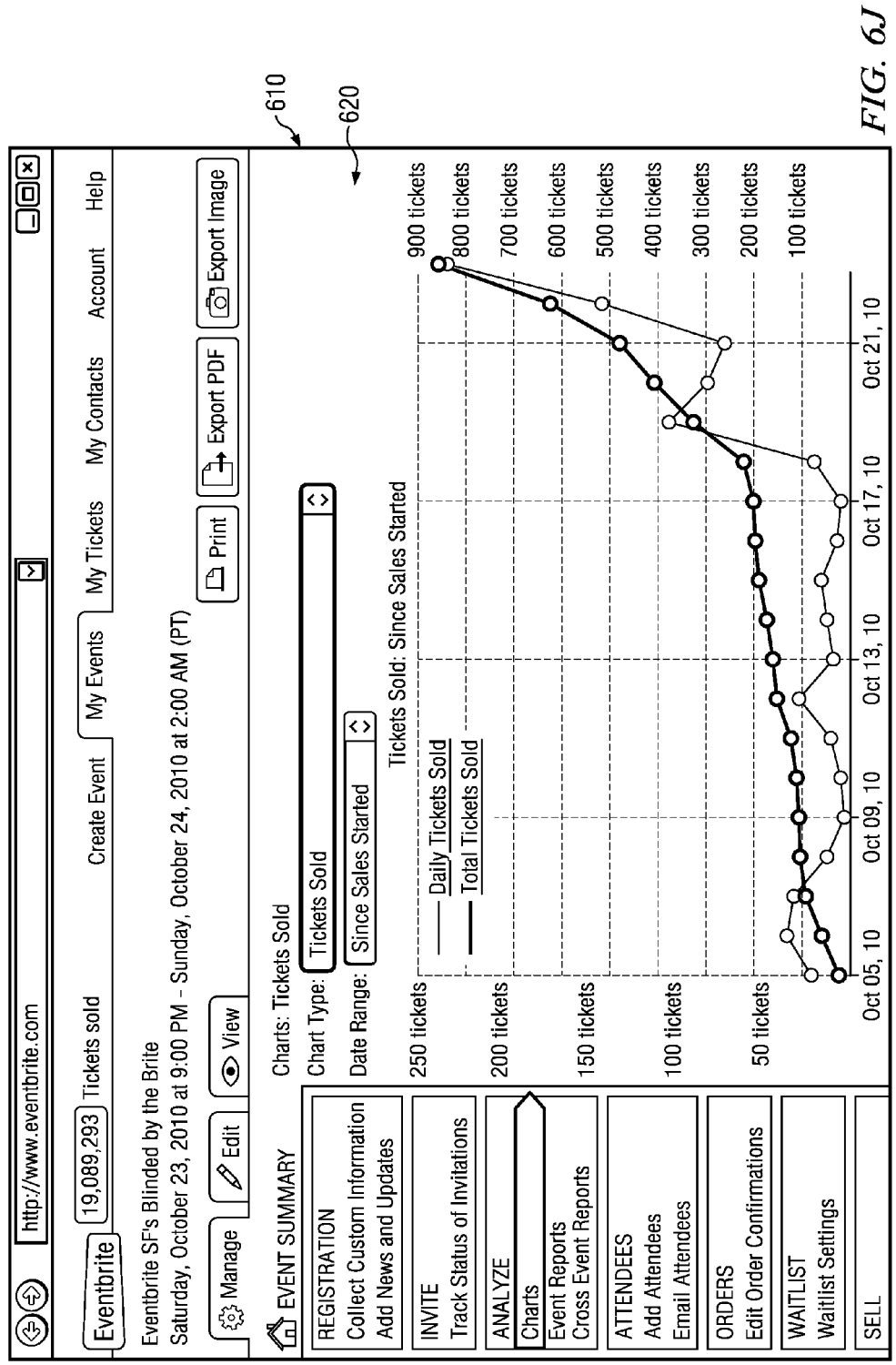
FIG. 6J illustrates an example attendance report.

FIG. 6J illustrates an example attendance report showing ticket sales over time. The user interface 620 displays a chart showing the number of tickets sold during a series of time ranges, and also the total number of tickets sold in all the time ranges. Here, the thin line shows the number of tickets sold each day, while the thick line shows the total number of tickets sold over all the time ranges. Although FIG. 6J illustrates a user interface 620 showing ticket sales by the number of tickets sold amount, this disclosure contemplates showing ticket sales in any suitable manner. As an example and not by way of limitation, ticket sales over time may be shown with respect to the dollar value of tickets sold over time. A user 101 may select a particular time range from which to display ticket sales over time. Here, the user 101 has selected "Since Sales Started," or in other words to show all ticket sales over time, however any suitable time range may be used. Although FIG. 6J illustrates an attendance report showing particular ticket sales over time, this disclosure contemplates an attendance report showing any suitable ticket sales over time. Moreover, although FIG. 6J illustrates an attendance report showing ticket sales over time using a particular graphic display, this disclosure contemplates an attendance report showing ticket sales over time using any suitable graphic display.

Figure 7:
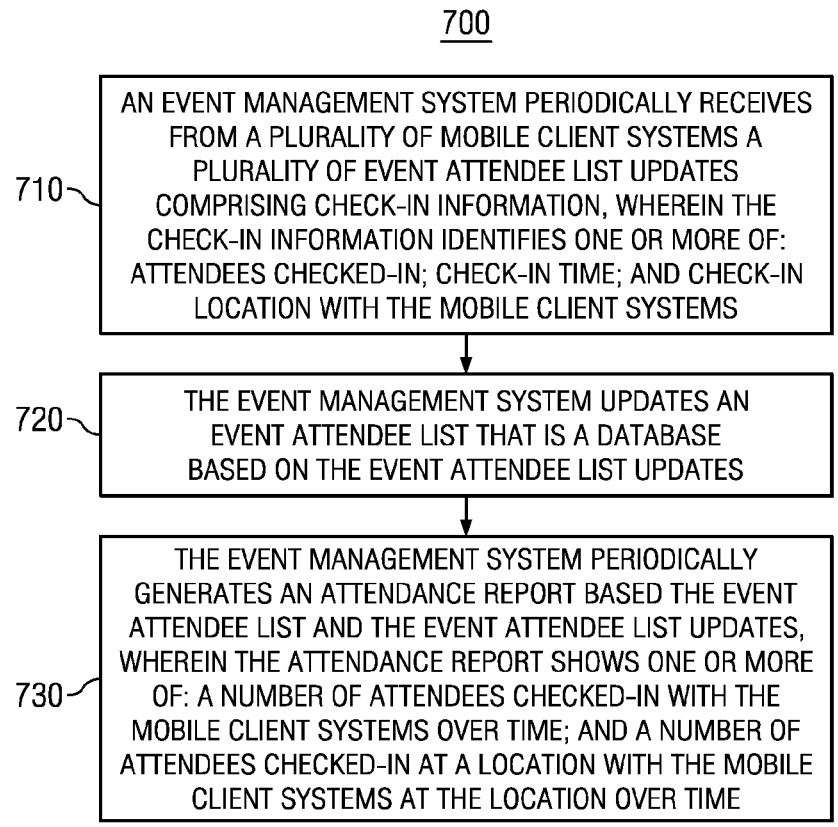
FIG. 7 illustrates an example method for generating an attendance report based on real-time event attendee information.

FIG. 7 illustrates an example method 700 for generating an attendance report based on real-time event attendee information. The method begins at step 710, where an event management system 170 may periodically receive from a plurality of mobile client systems 130 a plurality of event attendee list updates. The event attendee list updates may include check-in information for one or more attendees. As an example and not by way of limitation, the check-in information may identify the attendees who have checked-in, check-in time, check-in location, the particular mobile client system 130 used to check-in the attendee, and other suitable check-in information. At step 720, the event management system 170 may update an event attendee list that is a database based on the plurality of event attendee list updates. At step 730, the event management system 170 may periodically generate an attendance report based the event attendee list and the plurality of event attendee list updates. As an example and not by way of limitation, the attendance report may show the number of attendees checked-in with the mobile client systems 130 over time. As another example and not by way of limitation, the attendance report may show the number of attendees checked-in at a location with the mobile client systems 130 at the location over time. Although this disclosure describes event management system 170 generating particular attendance reports, this disclosure contemplates event management system 170 generating any suitable attendance reports, such as, for example, the attendance reports illustrated in FIGS. 6A thru 6J. In particular embodiments, the event management system 170 may then display the attendance report on any suitable display. In particular embodiments, the event management system 170 may transmit an attendance report to a mobile client system 130, where it can be reviewed and displayed. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components carrying out particular steps of the method of FIG. 7, this disclosure contemplates any suitable combination of any suitable components carrying out any suitable steps of the method of FIG. 7.

Systems and Methods

Figure 8:
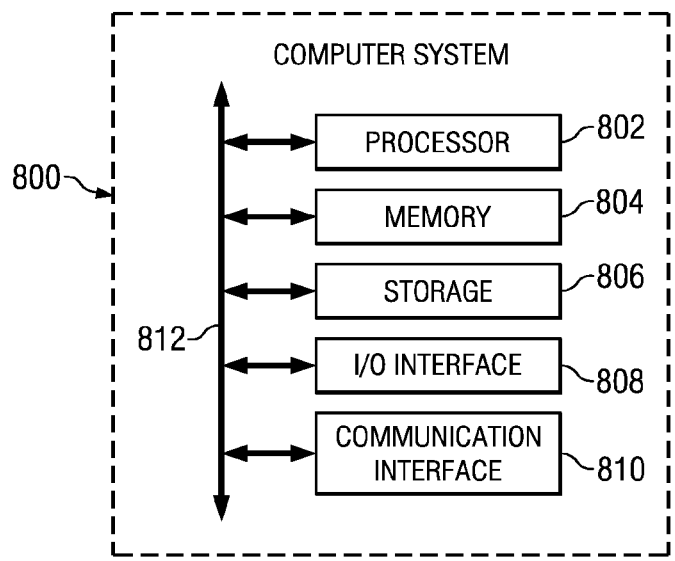
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 9:
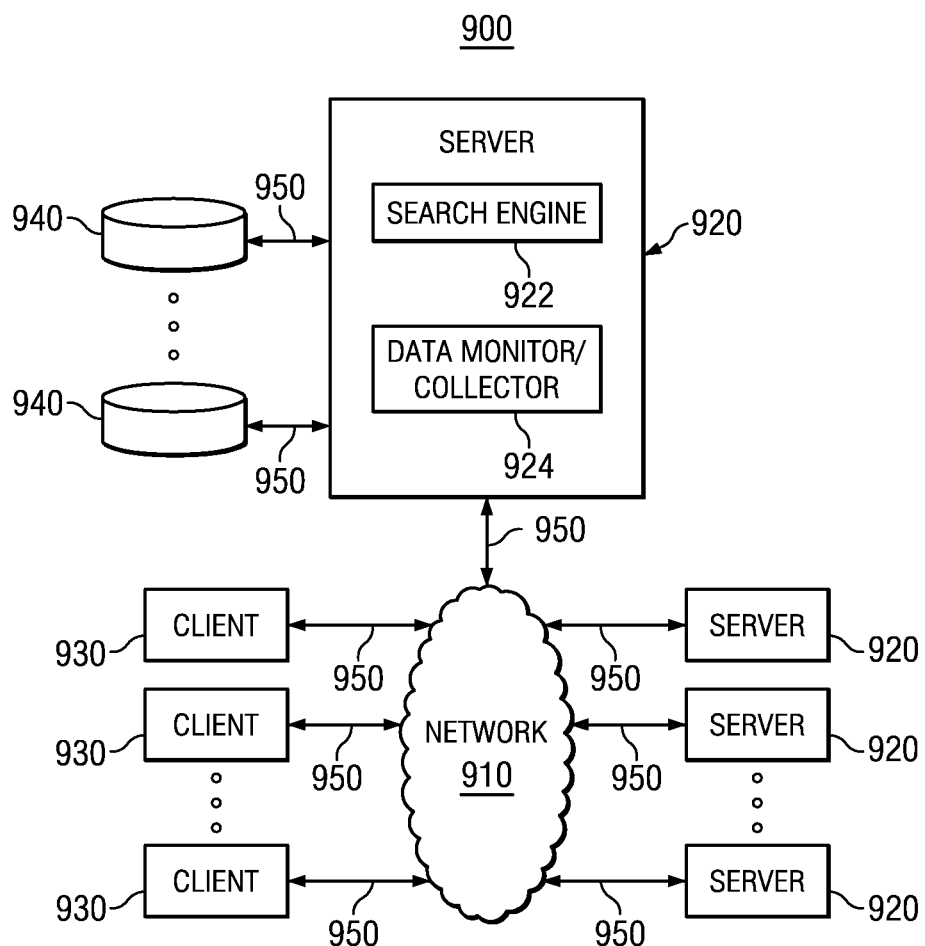
FIG. 9 illustrates an example network environment.

FIG. 9 illustrates an example network environment 900. This disclosure contemplates any suitable network environment 900. As an example and not by way of limitation, although this disclosure describes and illustrates a network environment 900 that implements a client-server model, this disclosure contemplates one or more portions of a network environment 900 being peer-to-peer, where appropriate. Particular embodiments may operate in whole or in part in one or more network environments 900. In particular embodiments, one or more elements of network environment 900 provide functionality described or illustrated herein. Particular embodiments include one or more portions of network environment 900. Network environment 900 includes a network 910 coupling one or more servers 920 and one or more clients 930 to each other. This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 couple servers 920 and clients 930 to network 910 or to each other. This disclosure contemplates any suitable links 950. As an example and not by way of limitation, one or more links 950 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 950. In particular embodiments, one or more links 950 each includes an intranet, an extranet, a VPN, a LAN, a WLAN, a WAN, a MAN, a communications network, a satellite network, a portion of the Internet, or another link 950 or a combination of two or more such links 950. Links 950 need not necessarily be the same throughout network environment 900. One or more first links 950 may differ in one or more respects from one or more second links 950.

This disclosure contemplates any suitable servers 920. As an example and not by way of limitation, one or more servers 920 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 920 includes hardware, software, or both for providing the functionality of server 920. As an example and not by way of limitation, a server 920 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 930, the web server may communicate one or more such files to client 930. As another example, a server 920 that operates as a mail server may be capable of providing e-mail services to one or more clients 930. As another example, a server 920 that operates as a database server may be capable of providing an interface for interacting with one or more data stores (such as, for example, data stores 940 described below). Where appropriate, a server 920 may include one or more servers 920; be unitary or distributed; span multiple locations; span multiple machines; span multiple datacenters; or reside in a cloud, which may include one or more cloud components in one or more networks.

In particular embodiments, one or more links 950 may couple a server 920 to one or more data stores 940. A data store 940 may store any suitable information, and the contents of a data store 940 may be organized in any suitable manner. As an example and not by way or limitation, the contents of a data store 940 may be stored as a dimensional, flat, hierarchical, network, object-oriented, relational, XML, or other suitable database or a combination or two or more of these. A data store 940 (or a server 920 coupled to it) may include a database-management system or other hardware or software for managing the contents of data store 940. The database-management system may perform read and write operations, delete or erase data, perform data deduplication, query or search the contents of data store 940, or provide other access to data store 940.

In particular embodiments, one or more servers 920 may each include one or more search engines 922. A search engine 922 may include hardware, software, or both for providing the functionality of search engine 922. As an example and not by way of limitation, a search engine 922 may implement one or more search algorithms to identify network resources in response to search queries received at search engine 922, one or more ranking algorithms to rank identified network resources, or one or more summarization algorithms to summarize identified network resources. In particular embodiments, a ranking algorithm implemented by a search engine 922 may use a machine-learned ranking formula, which the ranking algorithm may obtain automatically from a set of training data constructed from pairs of search queries and selected Uniform Resource Locators (URLs), where appropriate.

In particular embodiments, one or more servers 920 may each include one or more data monitors/collectors 924. A data monitor/collection 924 may include hardware, software, or both for providing the functionality of data collector/collector 924. As an example and not by way of limitation, a data monitor/collector 924 at a server 920 may monitor and collect network-traffic data at server 920 and store the network-traffic data in one or more data stores 940. In particular embodiments, server 920 or another device may extract pairs of search queries and selected URLs from the network-traffic data, where appropriate.

This disclosure contemplates any suitable clients 930. A client 930 may enable a user at client 930 to access or otherwise communicate with network 910, servers 920, or other clients 930. As an example and not by way of limitation, a client 930 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 930 may be an electronic device including hardware, software, or both for providing the functionality of client 930. As an example and not by way of limitation, a client 930 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 930 may include one or more clients 930; be unitary or distributed; span multiple locations; span multiple machines; span multiple datacenters; or reside in a cloud, which may include one or more cloud components in one or more networks.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method implemented by one or more processors of one or more servers associated with an event management system that includes a local file store and a relational database, comprising:

receiving, by one or more of the servers, a request for an event attendee list from a first mobile check-in device, the first mobile check-in device being associated with an event organizer of the event and with a check-in location at a venue for an event, wherein the first mobile check-in device comprises a embedded-database engine, wherein the event attendee list is a complete structured query language client-side database comprising a plurality of tables, indices, and triggers, and wherein the event attendee list identifies, for each of a plurality of attendees of the event:

a ticket identifier associated with a ticket for the event, the ticket being associated with the attendee;

an attendee identifier associated with the attendee; and whether the attendee is checked-in or not checked-in;

retrieving, by one or more of the servers, the event attendee list, wherein:

if the event attendee list is available in the local file store of the event management system, then retrieving the event attendee list from the local file store;

else:

retrieving attendee data associated with the event from the relational database;

converting the attendee data into the event attendee list; and storing the event attendee list in the local file store of the event management system; and transmitting, by one or more of the servers, the event attendee list to the first mobile check-in device.

2. The method of claim 1, further comprising:
periodically receiving from the first mobile check-in device a first event attendee list update identifying the one or more attendees checked-in with the first mobile check-in device; and
periodically transmitting to the first mobile check-in device a second event attendee list update that identifies one or more attendees who have checked-in with one or more second mobile check-in devices.

3. The method of claim 2, wherein:
the first event attendee list update is an application programming interface call and the second event attendee list update is a structured document object notation string.

4. The method of claim 1, wherein:
the event attendee list that is a client-side database comprises one or more order identifiers;
each order identifier is associated with one or more attendee identifiers; and
each attendee identifier is associated with one or more ticket identifiers.

5. The method of claim 1, wherein the request is hypertext-transfer protocol request message using an application programming interface.

6. An apparatus comprising: one or more processors; and a memory coupled to the processors comprising instructions executable by the processors, the processors operable when executing the instructions to:
receive a request for an event attendee list from a first mobile check-in device, the first mobile check-in device being associated with an event organizer of the event and with a check-in location at a venue for an event, wherein the first mobile check-in device comprises a embedded-database engine, wherein the event attendee list is a complete structured query language client-side database comprising a plurality of tables, indices, and triggers, and wherein the event attendee list identifies, for each of a plurality of attendees of the event:
a ticket identifier associated with a ticket for the event, the ticket being associated with the attendee;
an attendee identifier associated with the attendee; and
whether the attendee is checked-in or not checked-in;
retrieve the event attendee list, wherein:
if the event attendee list is available in a local file store of an event management system, then retrieving the event attendee list from the local file store;
else:
retrieving attendee data associated with the event from a relational database;
converting the attendee data into the event attendee list; and
storing the event attendee list in the local file store of the event management system; and
transmit the event attendee list to the first mobile check-in device.

7. The apparatus of claim 6, wherein the processors are further operable when executing the instructions to:
periodically receive from the first mobile check-in device a first event attendee list update identifying the one or more attendees checked-in with the first mobile check-in device; and
periodically transmit to the first mobile check-in device a second event attendee list update that identifies one or more attendees who have checked-in with one or more second mobile check-in devices.

8. The apparatus of claim 7, wherein:
the first event attendee list update is an application programming interface call and the second event attendee list update is a structured document object notation string.

9. The apparatus of claim 6, wherein:
the event attendee list that is a client-side database comprises one or more order identifiers;
each order identifier is associated with one or more attendee identifiers; and
each attendee identifier is associated with one or more ticket identifiers.

10. The apparatus of claim 6, wherein the request is hypertext-transfer protocol request message using an application programming interface.

11. One or more computer-readable non-transitory storage media embodying instructions that are operable when executed to:
receive a request for an event attendee list from a first mobile check-in device, the first mobile check-in device being associated with an event organizer of the event and with a check-in location at a venue for an event, wherein the first mobile check-in device comprises a embedded-database engine, wherein the event attendee list is a complete structured query language client-side database comprising a plurality of tables, indices, and triggers, and wherein the event attendee list identifies, for each of a plurality of attendees of the event:
a ticket identifier associated with a ticket for the event, the ticket being associated with the attendee;
an attendee identifier associated with the attendee; and
whether the attendee is checked-in or not checked-in;
retrieve the event attendee list, wherein:
if the event attendee list is available in a local file store of an event management system, then retrieving the event attendee list from the local file store;
else:
retrieving attendee data associated with the event from a relational database;
converting the attendee data into the event attendee list; and
storing the event attendee list in the local file store of the event management system; and
transmit the event attendee list to the first mobile check-in device.

12. The media of claim 11, wherein the media further embodies instructions that are operable when executed to:
periodically receive from the first mobile check-in device a first event attendee list update identifying the one or more attendees checked-in with the first mobile check-in device; and
periodically transmit to the first mobile check-in device a second event attendee list update that identifies one or more attendees who have checked-in with one or more second mobile check-in devices.

13. The media of claim 12, wherein:
the first event attendee list update is an application programming interface call and the second event attendee list update is a structured document object notation string.

14. The media of claim 11, wherein:
the event attendee list that is a client-side database comprises one or more order identifiers;
each order identifier is associated with one or more attendee identifiers; and
each attendee identifier is associated with one or more ticket identifiers.

15. The media of claim 11, wherein the request is hypertext-transfer protocol request message using an application programming interface.

* * * * *